(12) United States Patent
    Kummer

(10) Patent No.: US 10,096,983 B2
(45) Date of Patent: Oct. 9, 2018

(54) ELECTRICAL ACCESSORIES AND ASSOCIATED METHODS OF USE AND MANUFACTURE

(71) Applicant: SOUTHWIRE COMPANY, Carrollton, GA (US)

(72) Inventor: Randy Deon Kummer, Villa Rica, GA (US)

(73) Assignee: SOUTHWIRE COMPANY, Carrollton, GA (US)

( * ) Notice: Subject to any disclaimer, the term of this patent is extended or adjusted under 35 U.S.C. 154(b) by 314 days.

(21) Appl. No.: 14/068,602

(22) Filed: Oct. 31, 2013

(65) Prior Publication Data

US 2014/0054285 A1  Feb. 27, 2014

Related U.S. Application Data

(63) Continuation of application No. 12/711,917, filed on Feb. 24, 2010.

(60) Provisional application No. 61/239,978, filed on Sep. 4, 2009.

(51) Int. Cl.
| H02G 3/08 | (2006.01) |
| H02G 3/12 | (2006.01) |
| H02G 3/14 | (2006.01) |
| H02G 1/14 | (2006.01) |

(52) U.S. Cl.
CPC ............... *H02G 3/12* (2013.01); *H02G 1/14* (2013.01); *H02G 3/081* (2013.01); *H02G 3/086* (2013.01); *H02G 3/14* (2013.01); *H02G 3/08* (2013.01); *H02G 3/085* (2013.01); *Y10T 29/49194* (2015.01)

(58) Field of Classification Search
CPC ............ H02G 3/12; H02G 3/14; H02G 3/086; H02G 3/081; H02G 3/08; H02G 3/085; H02G 1/14; Y10T 29/49194
USPC .... 220/4.02, 3.2, 3.3, 3.5, 3.7, 3.8; 248/906; 439/538; 174/50, 53, 54, 58, 60, 63
See application file for complete search history.

(56) References Cited

U.S. PATENT DOCUMENTS

| 2,959,633 A | * | 11/1960 | Palmer | H02G 3/085 174/50 |
| 3,770,873 A | * | 11/1973 | Brown | 174/58 |
| 3,863,037 A | * | 1/1975 | Schindler et al. | 174/58 |
| 4,536,613 A | * | 8/1985 | Gallas | 174/660 |

(Continued)

*Primary Examiner* — J. Gregory Pickett
*Assistant Examiner* — Elizabeth Volz
(74) *Attorney, Agent, or Firm* — Eversheds Sutherland (US) LLP

(57) ABSTRACT

Electrical accessories and associated methods of use and manufacture are provided. In one embodiment, an electrical accessory can be provided. The electrical accessory can include an electrical junction box having a first side wall. The electrical accessory can also include an adjustable bracket coupled to the electrical junction box. The adjustable bracket can include a sliding plate and a mounting plate. The sliding plate can be positioned adjacent the first side wall and can be removably coupled to the electrical junction box. The adjustable bracket can also include a mounting hole axially aligned with the mounting hole of the first side wall of the junction box. The axially aligned mounting holes can be configured to receive a screw such that rotation of the screw moves the sliding plate and electrical junction box in relation to the mounting plate.

18 Claims, 41 Drawing Sheets

(56) References Cited

U.S. PATENT DOCUMENTS

| | | | |
|---|---|---|---|
| 4,580,689 A * | 4/1986 | Slater | 220/3.2 |
| 4,666,055 A * | 5/1987 | Lewis | 220/3.2 |
| 4,715,507 A * | 12/1987 | Chamberlin | 220/3.94 |
| 5,170,013 A * | 12/1992 | Borsh et al. | 174/53 |
| 5,170,014 A * | 12/1992 | Borsh | 174/53 |
| 5,703,327 A * | 12/1997 | Jorgensen | 174/53 |
| D390,200 S * | 2/1998 | Spano | D13/184 |
| 5,860,548 A * | 1/1999 | Kerr, Jr. | H02G 3/10 220/3.2 |
| 5,907,124 A * | 5/1999 | Reiker | 174/51 |
| 5,909,006 A * | 6/1999 | Reiker | 174/62 |
| 5,965,845 A * | 10/1999 | Reiker | 174/62 |
| 5,975,323 A * | 11/1999 | Turan | 220/3.7 |
| 5,981,874 A * | 11/1999 | Reiker | 174/63 |
| 6,281,439 B1 * | 8/2001 | Reiker | 174/62 |
| 6,303,859 B1 * | 10/2001 | Reiker | 174/50 |
| 6,303,862 B1 * | 10/2001 | Reiker | 174/62 |
| 6,335,486 B1 * | 1/2002 | Reiker | 174/51 |
| 6,365,831 B1 * | 4/2002 | Rupp et al. | 174/50 |
| 6,369,323 B1 * | 4/2002 | Wright | 174/51 |
| D457,140 S * | 5/2002 | Roesch et al. | D13/152 |
| 6,420,652 B1 * | 7/2002 | Byczek | 174/58 |
| 6,423,899 B1 * | 7/2002 | Reiker | 174/58 |
| 6,609,927 B2 * | 8/2003 | Kidman | 439/538 |
| 6,720,496 B1 * | 4/2004 | Weeks | 174/50 |
| 6,929,140 B2 * | 8/2005 | Rose | 220/3.7 |
| 6,946,603 B2 * | 9/2005 | Rose et al. | 174/66 |
| 7,112,743 B2 * | 9/2006 | Hull et al. | 174/58 |
| D531,128 S * | 10/2006 | Elberson | D13/152 |
| 7,118,413 B2 * | 10/2006 | Kidman | 439/538 |
| 7,151,220 B1 * | 12/2006 | Rubin de la Borbolla | 174/58 |
| 7,173,184 B2 * | 2/2007 | Hull et al. | 174/58 |
| 7,198,514 B1 * | 4/2007 | Grimes | 439/538 |
| 7,494,371 B2 * | 2/2009 | Kidman | 439/536 |
| 7,557,308 B2 * | 7/2009 | Dinh | 174/481 |
| 8,097,806 B2 * | 1/2012 | Lalancette et al. | 174/61 |
| 8,109,785 B2 * | 2/2012 | Kidman | 439/535 |
| 8,342,483 B1 * | 1/2013 | Manning | 254/134.3 R |
| 2003/0178218 A1 * | 9/2003 | Shotey et al. | 174/66 |
| 2004/0099661 A1 * | 5/2004 | Lalancette et al. | 220/3.3 |
| 2004/0182857 A1 * | 9/2004 | Feyes et al. | 220/3.2 |
| 2006/0131047 A1 * | 6/2006 | Dinh et al. | 174/58 |
| 2008/0149360 A1 * | 6/2008 | Dinh et al. | 174/58 |
| 2010/0032180 A1 * | 2/2010 | Korcz et al. | 174/50 |
| 2010/0078188 A1 * | 4/2010 | Youssef | H02G 3/12 174/50 |

* cited by examiner

ELECTRICAL ACCESSORIES AND ASSOCIATED METHODS OF USE AND MANUFACTURE

RELATED APPLICATION

This application is a continuation of, and claims priority under 35 U.S.C. § 120 (pre-AIA), to co-pending U.S. patent application Ser. No. 12/711,917 titled "Electrical Accessories and Associated Methods of Use and Manufacture," filed on Feb. 24, 2010, which claims priority to U.S. Provisional Patent Application Ser. No. 61/239,978, titled "Electrical Junction Boxes and Associated Methods of Use and Manufacture," filed on Sep. 4, 2009, the entire contents of each of which are hereby incorporated herein by reference for all purposes.

TECHNICAL FIELD

This invention generally relates to electrical accessories, and more particularly, to electrical accessories and associated methods of use and manufacture.

BACKGROUND

Electrical junction boxes are utilized to provide termination and connection points for electrical wiring. Generally, electrical wiring in residential and commercial construction will be installed in the walls or ceilings of the construction, and one or more electrical junction boxes can be provided at various points along the wiring to permit the installation of associated electrical switches and electrical outlets. In some instances, such as for wall mounted switches or electrical outlets, an installer may need a certain length of exposed electrical wiring to connect a switch or outlet to the electrical wiring. In such instances, the exposed electrical wiring should be contained within the junction box to protect residents and/or commercial workers from electrical hazards associated with exposed electrical wiring.

In certain circumstances, the placement of junction boxes by an installer may be difficult due to unique or custom wall construction. For such instances, a need exists for an electrical junction box operable to use in multiple locations.

In other circumstances, multiple junction boxes may be used for a particular construction site. Transport of multiple junction boxes may be difficult due to the unique shapes of such boxes. For such instances, a need exists for an electrical junction box operable to be transported in a relatively compact manner.

In certain other circumstances, exposed wiring may be relatively lengthy and an installer may not have time to shorten the wiring length to fit within an associated electrical junction box. Sometimes after installing a switch or outlet, the installer will attempt to fit the associated electrical wiring into the associated junction box but the length of the exposed wiring may make it rather difficult to suitably fit the wiring in the box. In such instances, a need exists for an electrical junction box operable to accommodate relatively lengthy exposed electrical wiring.

In certain other instances, particularly when multiple connections are using terminating connections, wire nuts may become relatively difficult for an installer to fit such terminations within the associated electrical junction box. In such instances, a need exists for an electrical junction box operable to accommodate the additional terminations and associated terminating devices.

BRIEF DESCRIPTION OF THE DRAWINGS

The foregoing, and other embodiments and aspects will be better understood from the following detailed description of the certain embodiments of the invention with reference to the drawings, in which.

DETAILED DESCRIPTION OF EMBODIMENTS OF THE INVENTION

Example embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terms "electrical accessory", "electrical junction box", "junction box", and their pluralized forms are used interchangeably throughout this specification, and are intended to refer to a receptacle or device enclosure used for mounting or affixing electrical wires to or within a receptacle or device enclosure, which can in turn be mounted to a wall or wall stud.

In accordance with example embodiments of the invention, electrical accessories and associated methods of use and manufacture are provided.

Figure 1:
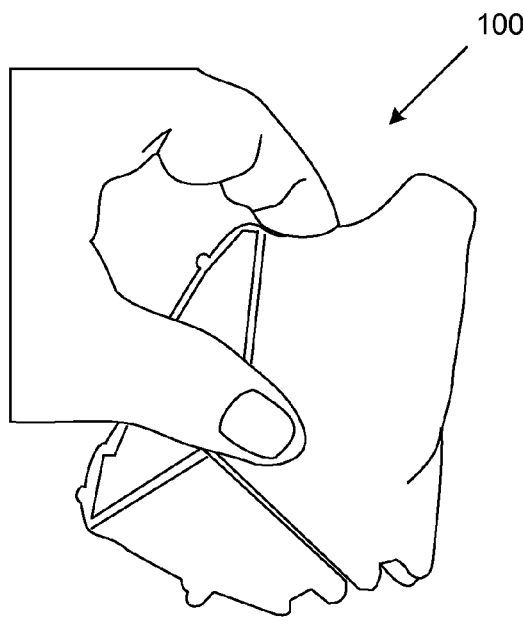
FIG. 1 is a side perspective view of an example flexible electrical junction box in accordance with an embodiment of the invention.

FIGS. 1-5 illustrate various views of example flexible electrical junction boxes and electrical accessories in accordance with an embodiment of the invention. As shown in FIG. 1, an example flexible electrical junction box can be substantially flexed and stretched by a manual force, such as the force exerted by a person's hand. In the embodiment shown in FIG. 2, a flexible electrical junction box 100 can include a rectangular-shaped housing that includes a pair of side walls 102, 104, an upper wall 106, a lower wall 108, and a rear wall 110. In certain embodiments, such as 100 in FIGS. 1 and 2, one or more cable openings 112, clamps 114, punch outs 116, and mounting holes 118 can be included. An opening 120 in the front portion of the junction box 100 is sized to receive an electrical component, such as a switch or outlet, which can be mounted within the junction box 100 via one or more screws secured within the mounting holes 118. Other features such as nail guides 122 and mounting brackets 124 can be included.

Figure 2:
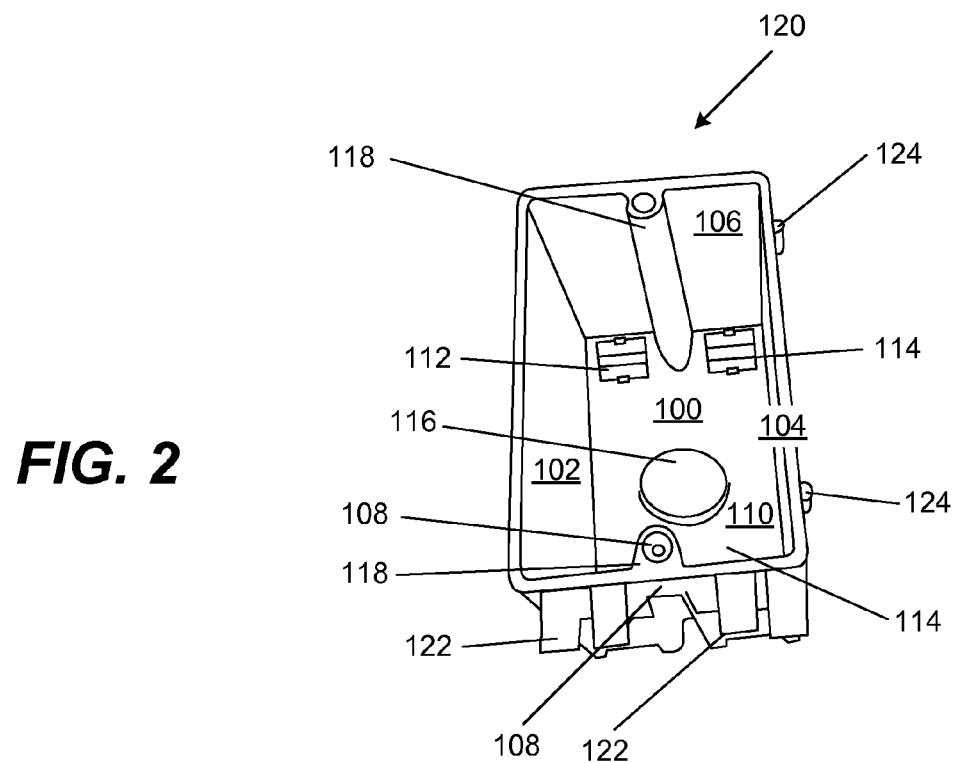
FIG. 2 is a front view of the junction box shown in FIG. 3 in accordance with an illustrative embodiment of the invention.

In the embodiment shown in FIGS. 1 and 2, some or all of the junction box 100 can be formed from a relatively flexible material such as flexible PVC (polyvinylchloride). In this manner, selected portions of a junction box 100 can be expandable to accommodate certain lengths of exposed electrical wiring inserted within the junction box 100, or to accommodate certain positioning of the junction box 100 with respect to a building's particular wall or floor construction. Components of the junction box that are relatively flexible can flex or otherwise move in response to certain forces imparted by inserting exposed electrical wiring within the junction box 100 or imparted by an installer attempting to position or otherwise mount the junction box 100 with respect to a building's particular wall or floor construction. In one instance, certain portions of the junction box 100 can flex or otherwise stretch to create more interior volume within the junction box to accommodate certain lengths of exposed electrical wiring inserted within the junction box 100. In another instance, certain portions of the junction box 100 can flex or otherwise stretch to modify the shape of the junction box to accommodate certain positioning of the junction box 100 with respect to a building's particular wall or floor construction. In any instance, the junction box 100 can accommodate a variety of circumstances associated with using, installing, and mounting the junction box 100 in a building.

In one embodiment, a "unitary"-type junction box can be provided, wherein substantially all of the junction box 100 can be made from flexible PVC.

In one embodiment, a "hybrid"-type junction box can be provided, wherein selected portions of the junction box 100 can be made from flexible PVC, and other portions of the junction box 100 can be made from a relatively sturdy material such as molded polyvinylchloride (PVC), polypropylene, polystyrene, polyethylene, or ABS. In one aspect of the embodiment, a rear wall, such as 110, can be made from flexible PVC, while all other portions of the junction box 100 can be made from a relatively sturdy material such as molded polyvinylchloride (PVC). In another aspect, a rear wall, such as 110, and portions of the side walls, upper wall, and lower wall, can be made from flexible PVC, while the remaining portions of the side walls, upper wall, and lower wall can be made from a relatively sturdy material such as molded polyvinylchloride (PVC).

In one aspect of an embodiment, selected portions of a junction box, such as 100, can include expansion bellows or other similar devices to permit certain portions of the junction box 100 to expand or otherwise permit the junction box 100 to accommodate certain lengths of exposed electrical wiring inserted within the junction box 100.

In one aspect of an embodiment, selected portions of a junction box, such as 100, can include pop-out sections or other similar devices to permit certain portions of the junction box 100 to expand or otherwise permit the junction box 100 to accommodate certain lengths of exposed electrical wiring inserted within the junction box 100.

In one aspect of an embodiment, a junction box made from more than one material, such as a flexible PVC and a relatively sturdy PVC, or other materials that may be co-extruded.

In one aspect of an embodiment, certain components of a junction box made from more than one material, such as a flexible PVC and a relatively sturdy PVC, which can be joined together using a series of notches and corresponding extensions, wherein some or all of the notches may fit snugly into corresponding extensions.

In one aspect of an embodiment, some or all of the junction box or certain components of a junction box can be colored using a marker color, such as a luminescent or fluorescent colorant, to facilitate visibility of certain portions of the junction box In one aspect of an embodiment, certain portions of a junction box can be reinforced with, for example, one or more metallic or fiberglass strands or stiffeners, to maintain a rectangular-shape or other desired shape of the opening, such as 120, when the junction box is installed.

In one aspect of an embodiment, one or more stiffeners, contoured shapes, or patterns can be formed in certain portions of a junction box to facilitate maintaining a rectangular-shape or other desired shape of the opening, such as 120, when the junction box is installed.

In one aspect of an embodiment, one or more contoured shapes or patterns, such as a spider-shaped structure, can be formed in certain portions of a junction box to facilitate molding and melt flow of one or more associated materials used in the box when the junction box is manufactured.

In one aspect of an embodiment, one or more mounting holes, such as 118 in FIG. 2, can be reinforced with metallic or plastic screw mounts or similar devices to assist threading of associated screws within the mounting holes.

In one aspect of an embodiment, one or more stud markers can be positioned at certain portions of a junction box, such as on the side walls and adjacent to the corners of the box, to minimize deflection of the junction box when the box is mounted to a wall stud.

In one aspect of an embodiment, one or more guides can be positioned at certain portions of a junction box to facilitate transferring forces applied by a mounting device to the one or more guides from other portions of the junction box.

Figure 3:
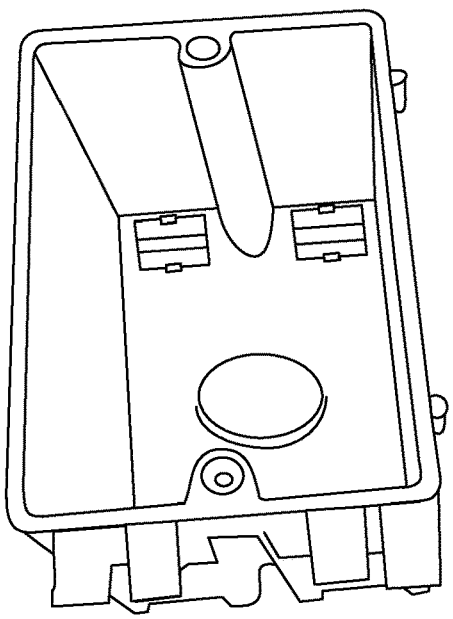
FIG. 3 is a rear perspective view of example flexible electrical junction boxes in accordance with an embodiment of the invention.
Figure 4:
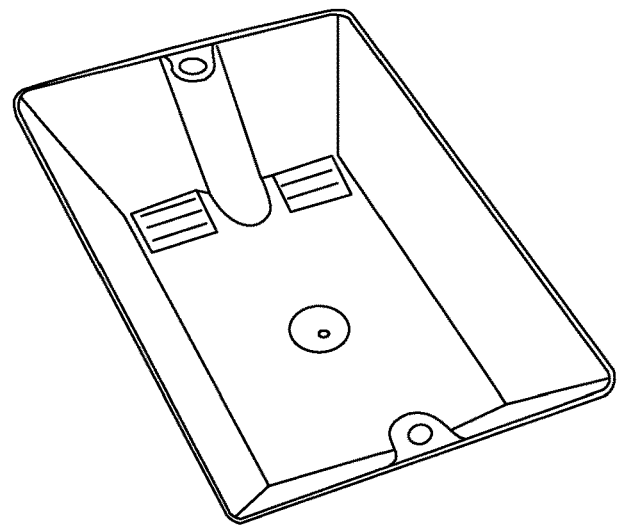
FIG. 4 is a front perspective view of the junction boxes shown in FIG. 3 in accordance with an illustrative embodiment of the invention.
Figure 5:
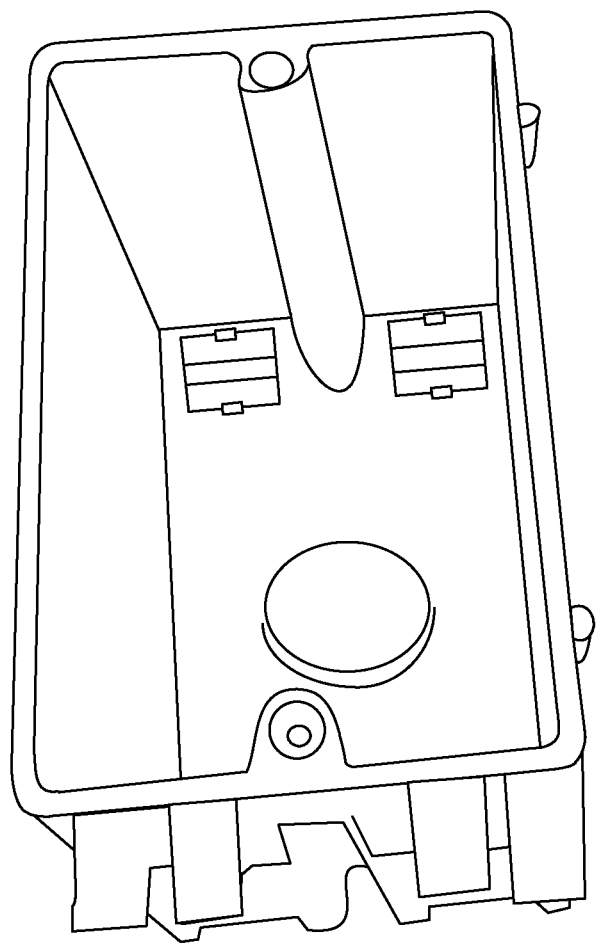
FIG. 5 is a perspective view of a pair of example flexible electrical junction boxes in accordance with an embodiment of the invention.

As shown in FIGS. 3-5, various common junction box and electrical accessory features such as, but not limited to, nail guides, stud guides, punchouts, receptacle holes, coverplate holes, and other screw, fastener or boltholes can be molded or otherwise formed into relatively flexible junction boxes and electrical accessories according to embodiments of the invention. The junction boxes shown as 100 in FIGS. 1-2, and in FIGS. 3-5 are shown by way of example only, and other configurations, shapes, and designs can exist in accordance with other embodiments of the invention.

FIGS. 6A, 6B, 7A, 7B, 8-16, and 22-40 illustrate various views of mountable electrical junction boxes and electrical accessories in accordance with embodiments of the invention. In the embodiment shown in FIGS. 6A and 6B, an electrical junction box 200 can include a rectangular-shaped housing that includes a pair of side walls 202, 204, an upper wall 206, a lower wall 208, and a rear wall 210. In certain embodiments, such as 200 in FIGS. 6A and 6B, one or more cable openings, clamps, punch outs 216, and mounting holes 218 can be included. An opening 220 in the front portion of the junction box 200 is sized to receive an electrical component, such as a switch or outlet, which can be mounted within the junction box 200 via one or more screws secured within the mounting holes 218. Furthermore, the junction box 200 shown in FIGS. 6A and 6B can include a series of mounting brackets 222, 224, 226 positioned on a single wall, or the same end wall, of the junction box 200. In the embodiment shown in FIGS. 6A and 6B, a pair of relatively flat, rectangular-shaped mounting brackets 222, 224 can extend from opposing portions of the lower wall 208, with the relatively shorter side of the brackets 222, 224 mounted to the lower wall 208, wherein the brackets 222, 224 are substantially coplanar to each other as well as to the lower wall 208 from which they extend. In addition, a relatively flat, rectangular-shaped mounting bracket 226 can extend from an intermediate portion of the lower wall 208, with the relatively longer side of the bracket 226 mounted to the lower wall 208, wherein the bracket 226 is substantially perpendicular to each of the other mounting brackets 222, 224 and to the lower wall 208. In each of the respective mounting brackets 222, 224, 226, one or more mounting holes 228, 230, 232, with relatively slight countersinks, can be included to receive corresponding mounting devices, such as nails, screws, or other suitable devices used to mount a junction box to at least one wall stud. Some or all of the brackets 222, 224, 226 can be formed from the same material as the electrical junction box 200, such as a relatively sturdy material, for instance, PVC (polyvinylchloride).

In this manner, a junction box such as 200 can accommodate a variety of positioning options for the junction box 200 with respect to a building's particular wall or floor construction. An installer attempting to position or otherwise mount the junction box 200 with respect to a building's particular wall or floor construction can quickly select an appropriate bracket or pair of brackets to mount the junction box 200 to an adjacent wall stud. In one instance, the pair of mounting brackets 222, 224 on opposing portions of the lower wall 208 can be used to mount the junction box 200 to a vertically aligned wall stud. In another instance, the mounting bracket 226 extending substantially perpendicular to the lower wall 208 can be used to mount the junction box 200 to a horizontally aligned wall stud. In any instance, the junction box 200 with the mounting brackets 222, 224, 226 can accommodate a variety of circumstances associated with using, installing, and mounting the junction box 200 in a building.

In one embodiment, some or all of the mounting brackets associated with a junction box, such as brackets 222, 224, and 226 of junction box 200, can include one or more perforations or weakened regions between the respective bracket and the junction box 200. In this manner, some of the brackets, particularly unused brackets, can be removed from the junction box 200 prior to or after installation.

In one embodiment, the punch outs, such as 216, can be concentrically aligned similar to the punch out configuration shown in FIGS. 30-31 described below. In any instance, a junction box such as 200 can be configured with either concentrically aligned punch outs and/or non-concentrically aligned punch outs, which are illustrated by way of example as 216 in FIGS. 6A and 6B.

Figure 6A:
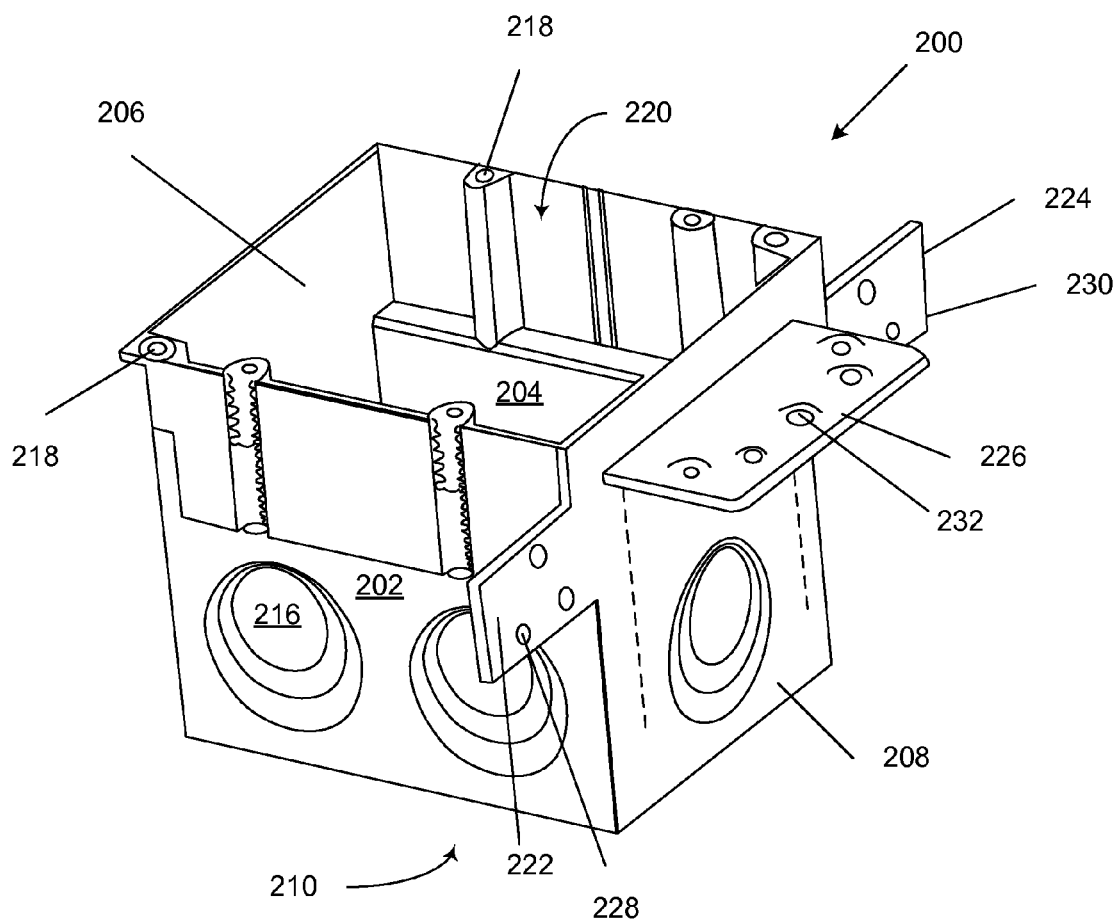
FIGS. 6A and 6B are perspective views of an example mountable junction box in accordance with embodiments of the invention.
Figure 6B:
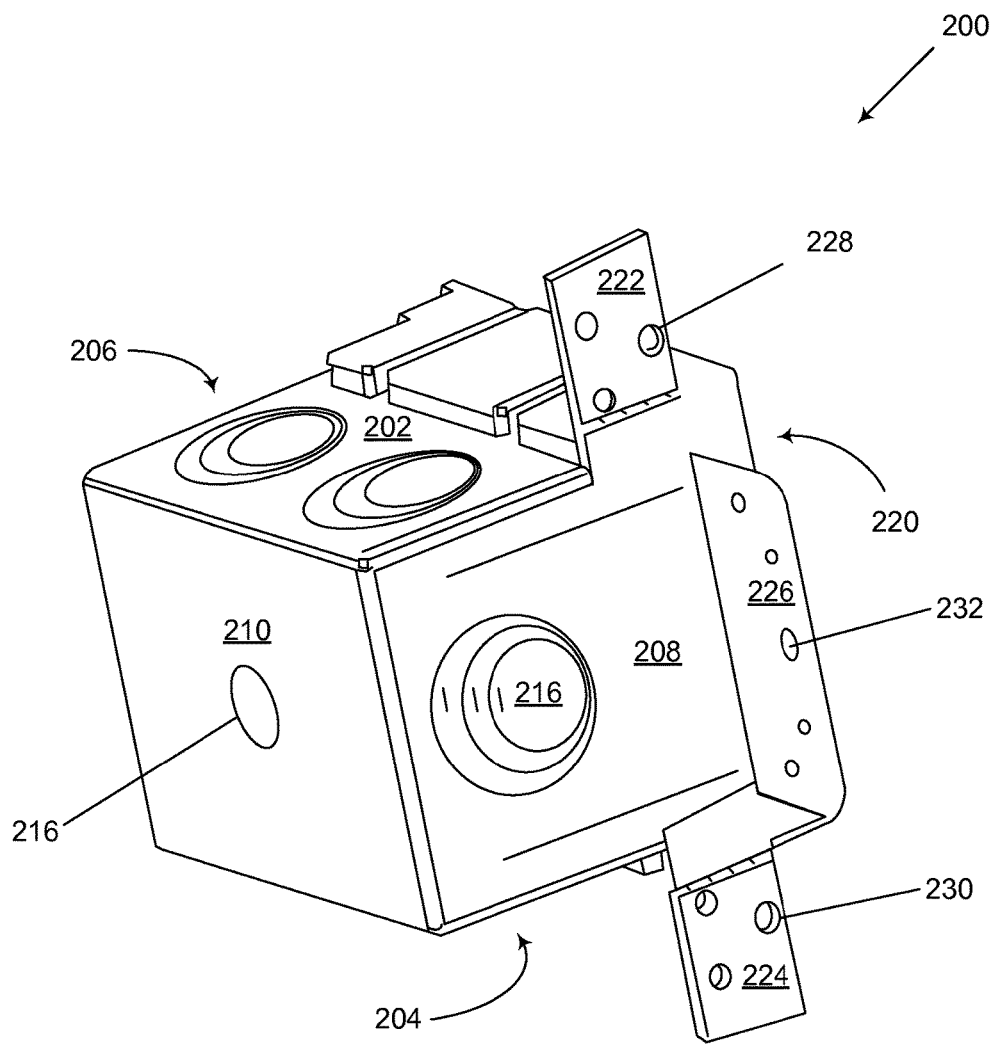

The junction box 200 shown in FIGS. 6A and 6B is shown by way of example only, and other configurations, shapes, and designs can exist in accordance with other embodiments of the invention.

Figure 7A:
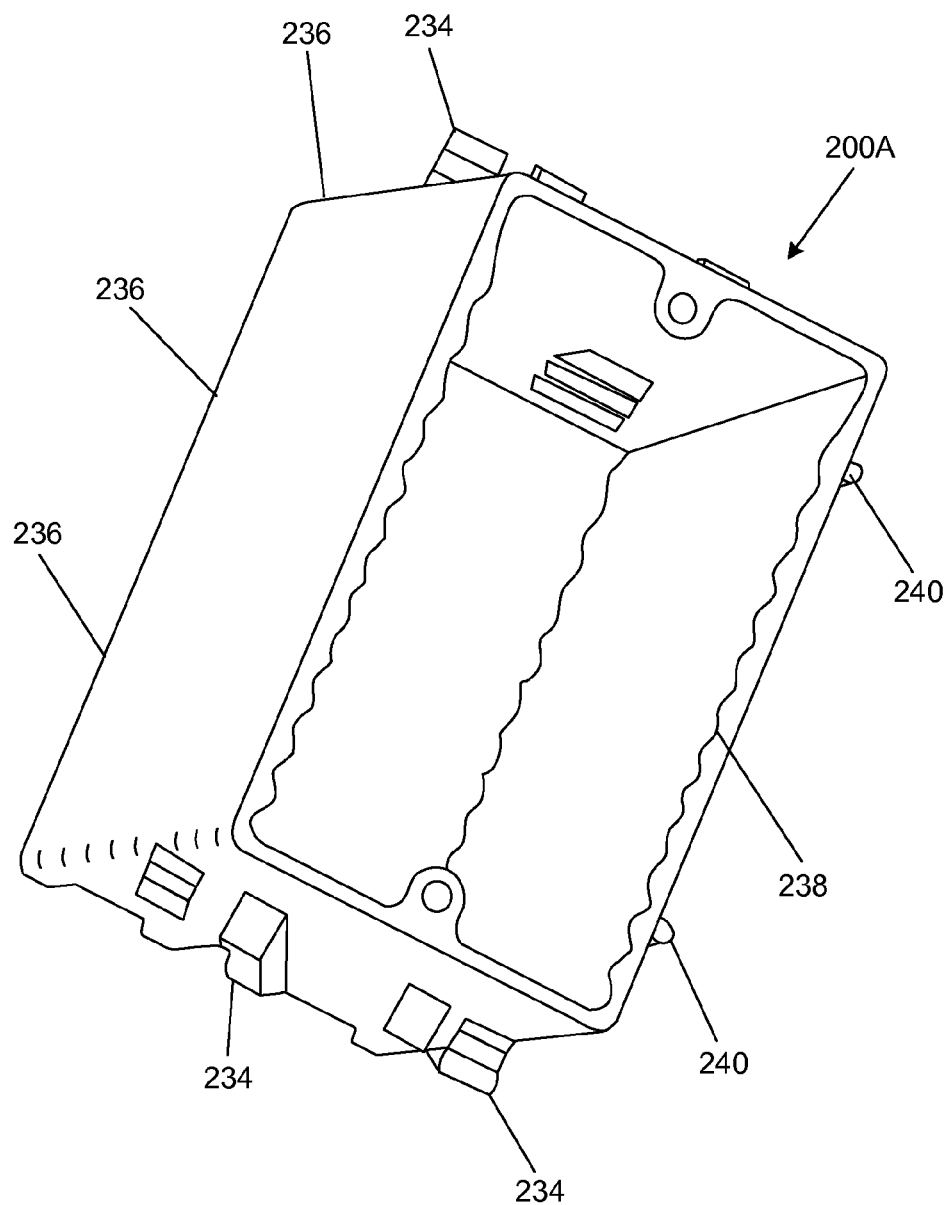
FIG. 7A is a perspective view of an example mountable junction box in accordance with an embodiment of the invention.
Figure 7B:
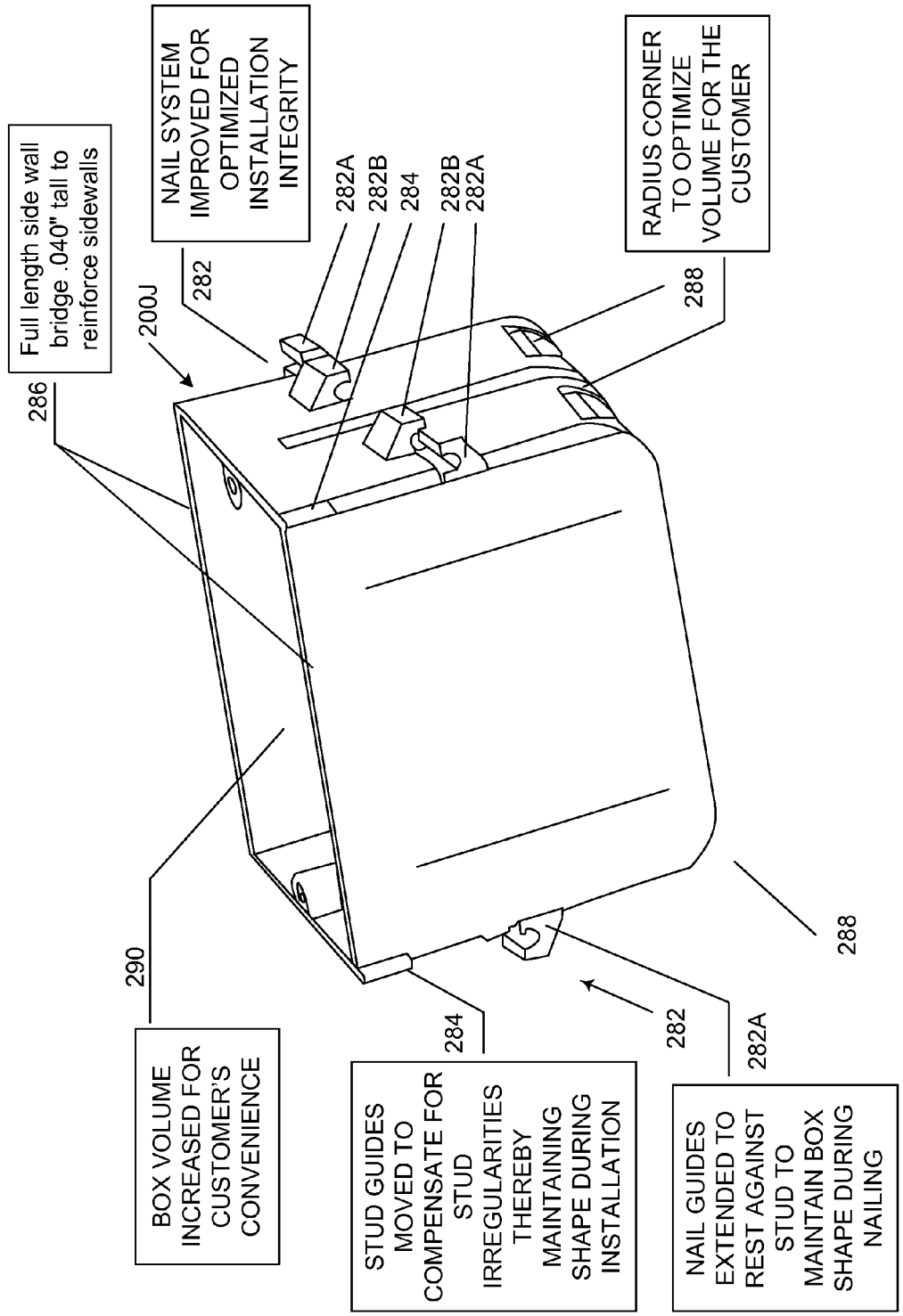
FIG. 7B is a perspective view of another example mountable junction box in accordance with an embodiment of the invention.
Figure 8:
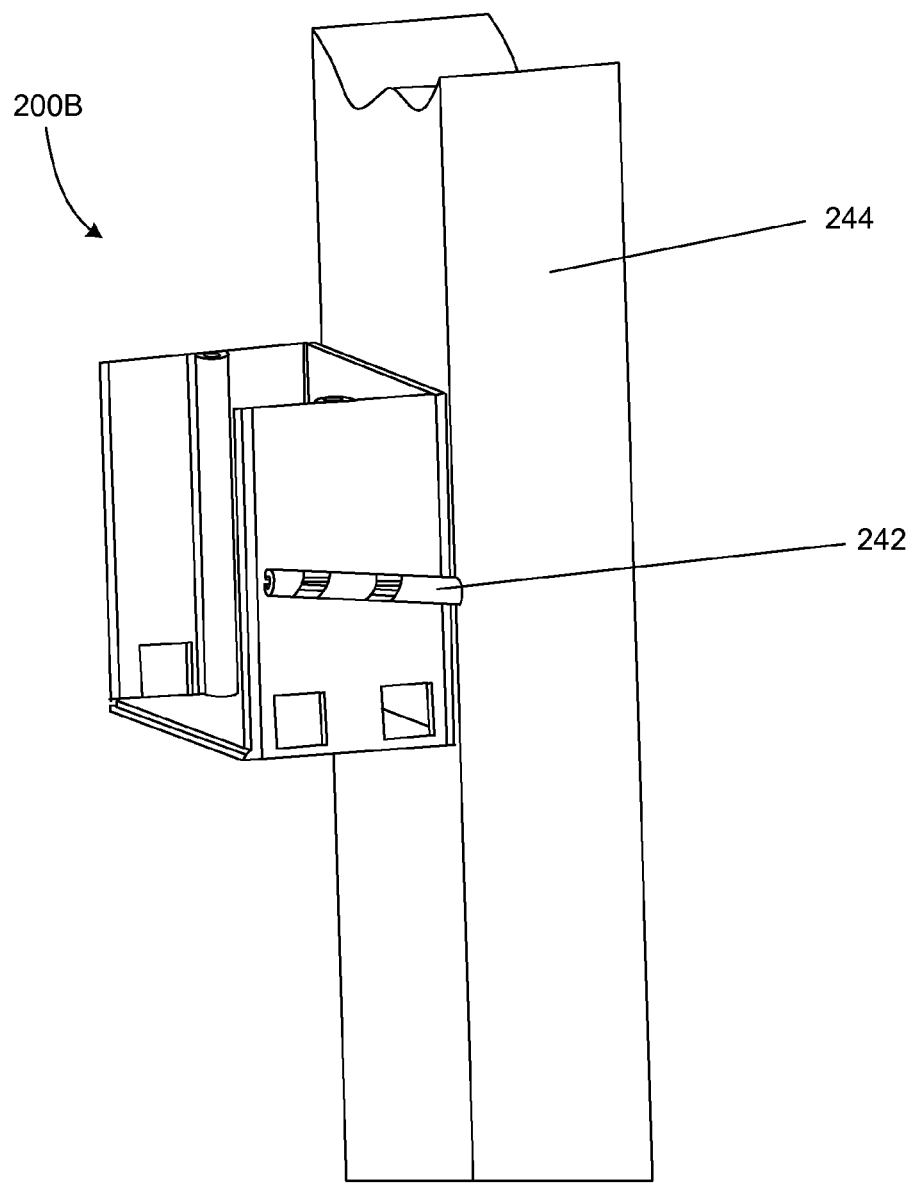
FIGS. 8-10 are side perspective views of example mountable junction boxes in accordance with embodiments of the invention.
Figure 9:
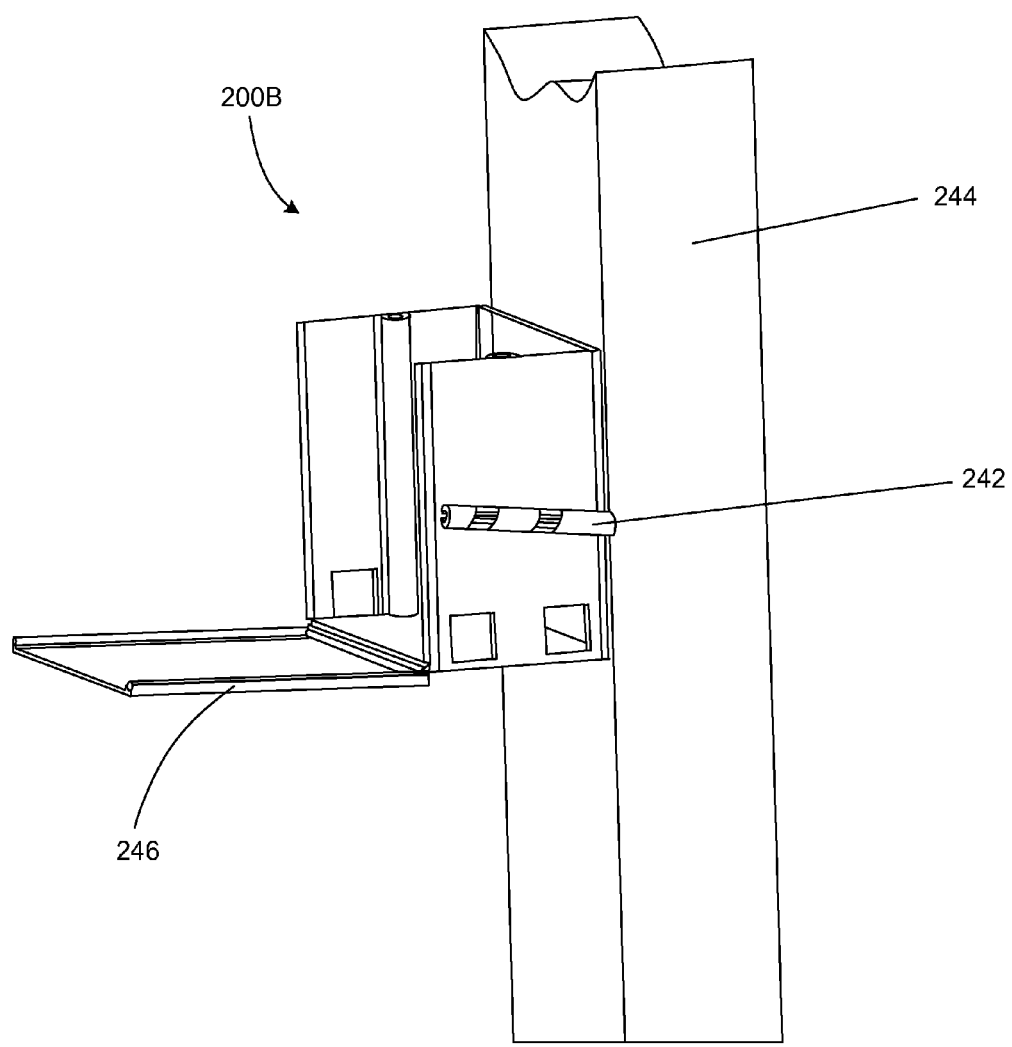
Figure 10:
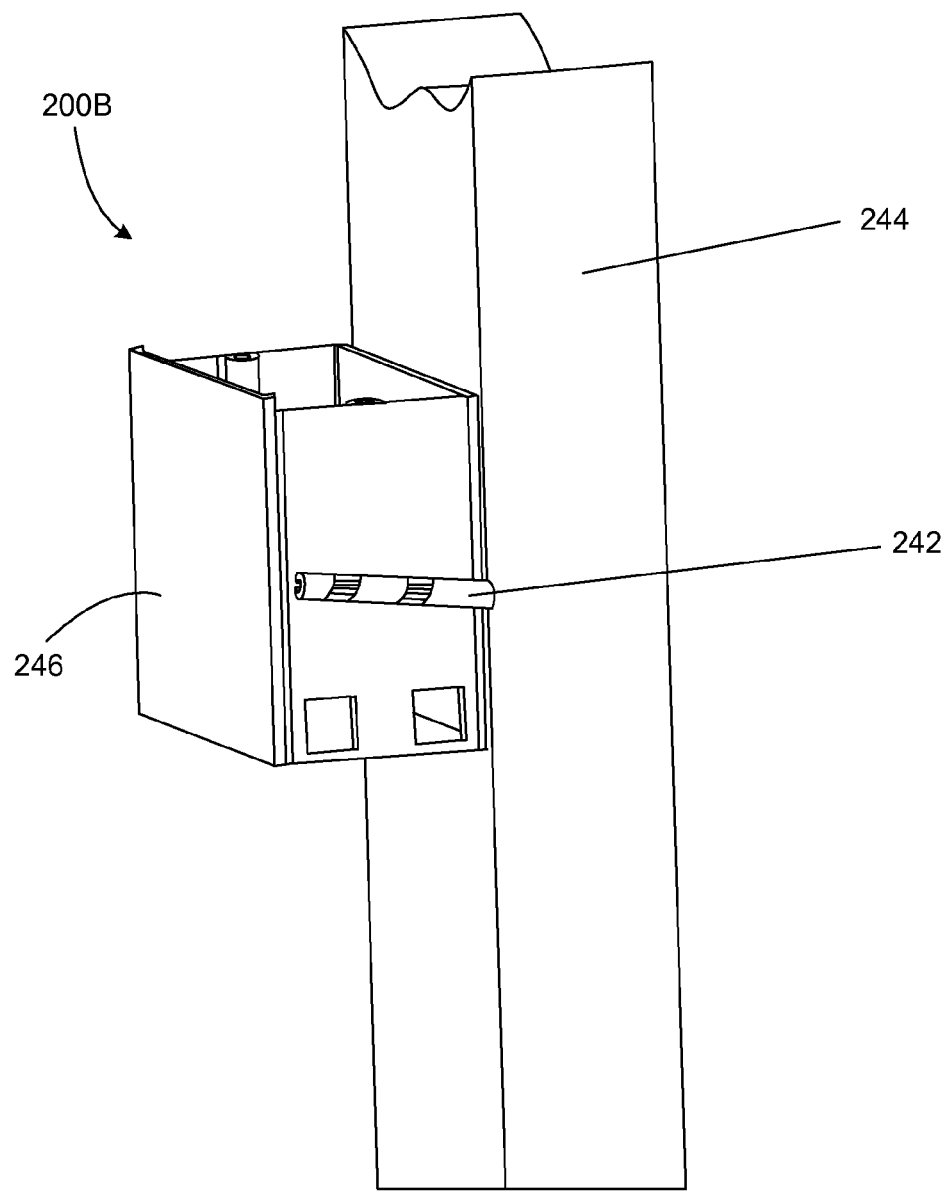

FIGS. 7A, 7B, 8-16, and 22-40 illustrate various views of example mountable junction boxes and electrical accessories with various aspects in accordance with embodiments of the invention. FIG. 7A shows one embodiment of a mountable junction box 200A operable to be mounted to a lateral side of a wall stud or wall; FIG. 7B shows another embodiment of a mountable junction box 200J operable to be mounted to a lateral side of a wall stud or wall; FIGS. 8-10 illustrate an embodiment of a mountable junction box 200B operable to be mounted to a face portion of a wall stud or wall; and FIGS. 11-16 illustrate embodiments of mountable junction boxes 200C, 200D, 200E, 200F, 200G, 200H, 200I operable to be mounted to a lateral side of a wall stud or wall. FIGS. 22-40 illustrate embodiments of mountable electrical accessories and/or junction boxes 700, 800, 900, 1000, 1104, 1204, 1300, 1400, 1500, 1600, 1700 operable to be mounted adjacent to another electrical accessory and/or within or to a lateral side of a wall stud or wall.

For example, in the embodiment shown in FIG. 7A, the mountable junction box 200A can include one or more brackets or a set of nail guides 234 mounted to one or more side walls or end walls of the junction box 200A. In addition, the mountable junction box 200A can include one or more stiffeners, contoured shapes, or patterns 236, 238 formed in certain portions of a junction box to facilitate maintaining a rectangular-shape or other desired shape of the opening, such as 120. Furthermore, one or more stud markers 240 or stud guides can be positioned at certain portions of a junction box, such as on the side walls and adjacent to the corners of the box, to minimize deflection of the junction box when the box is mounted to a wall stud and/or to orient the junction box with respect to a face of a wall stud or wall. In certain embodiments, the one or more stud guides can be operable to maintain a predefined distance between a frame face and a face of an adjacent stud or wall and the frame during installation of the electrical accessory In the embodiment shown in FIG. 7B, the side walls 286 of the mountable junction box 200J are in parallel relation with each other, and likewise, the end walls are also in parallel relation with each other, wherein a frame face 287 is defined by upper edges of the two side walls and the two end walls. A lower wall or fifth wall of the junction box 200J is disposed between the two side walls and two end walls. The mountable junction box 200J can include one or more brackets or a set of nail guides 282 mounted to one or more side walls 286 or end walls of the junction box 200J. As shown in FIG. 7B, the nail guides 282 can include a plurality of guide portions, such as one or more upper and lower guide portions 282A, 282B mounted to end walls of the junction box 200J. In the embodiment shown in FIG. 7B, the guide portions, such as 282A and 282B, adjacent to the corners of the junction box 200J can extend slightly beyond the side walls to provide additional mounting support to adjacent wall studs when the nail guides 282 are mounted to a wall stud and nails or fasteners are driven through the nail guides 282. That is, when the junction box 200J is positioned against an adjacent wall stud during installation of the junction box 200J, the nail guide 282, particularly lower guide portions 282A and upper guide portions 282B, are positioned immediately adjacent to the wall stud 200J. Lower guide portions 282A and upper guide portions 282B can be configured to receive or otherwise contact a portion of a nail or other type of fastener. For example, each of the guide portions 282A and 282B can include a slot or groove shaped to receive an axial portion of the nail. Furthermore, each of the guide portions 282A, 282B can be positioned in opposing configurations to contact a different portion of the nail and/or fastener. For instance, a lower guide portion 282A can be positioned to receive or contact a lower axial portion of a nail, and an upper guide portion 282B can be positioned to receive or contact an upper axial portion of a nail. In this manner, the nail guides such as 282 can absorb some or all of the force applied to the nail guides 282 and junction box 200J during installation when nails or fasteners are driven through the nail guides 282 as the junction box 200J is mounted to an adjacent wall stud. Avoiding some or all of such force can minimize or prevent flexing of the junction box 200J during installation. This may help the junction box 200J maintain its general or approximate rectangular shape during installation. That is, the nail guides 282 can be operable to maintain the approximate shape of the junction box 200J during installation.

In addition, the mountable junction box 200J can include one or more brackets or stud guides 284 mounted to one or more side walls or end walls of the junction box 200J. As shown in FIG. 7B, the stud guides 284 can be shaped as relatively short protrusions mounted to the side walls and adjacent to the corners of the junction box 200J. For example, a stud guide such as 284 can be positioned at a junction between at least one side wall such as 286 and at least one end wall. In the embodiment shown in FIG. 7B, the stud guides 284 can extend slightly beyond the side walls 286, e.g., perpendicularly to the side walls 286, to provide additional positioning guidance to adjacent wall studs when the junction box 200J is mounted to an adjacent wall stud. That is, when the junction box 200J is positioned against an adjacent wall stud during installation of the junction box 200J, the stud guide 284, can be positioned immediately adjacent to a face of the wall stud 200J or wall. Thus, each stud guide 284 can maintain a predefined distance between a frame face, such as 287, and a face of an adjacent wall stud or wall and the junction box 200J during installation of the box 200J. In this manner, the stud guides 284 can help a user position the junction box 200J with respect to a wall stud or wall and/or the stud guides 284 may absorb some or all of the force applied to the stud guide 284 and junction box 200J, particularly during installation when nails or fasteners are driven through the nail guides 282 as the junction box 200J is mounted to an adjacent wall stud. In certain instances, avoiding some or all of such force can minimize or prevent flexing of the junction box 200J during installation. This may also help the junction box 200J maintain its general or approximate rectangular shape during installation.

Furthermore, the mountable junction box 200J can include an increased side wall width or bridge 286 to increase the strength and rigidity of the junction box 200J. The increased side wall width or bridge 286 can be along a length of at least one side wall, such as the width of an upper portion of the side wall, wherein the bridge 286 is operable to provide added material thickness to a portion of the at least one side wall. For example, the bridge 286 or width of an upper portion of the side wall, particularly between the stud guides 284 adjacent the corners of the junction box 200J, can be increased in material thickness. The approximate height of the increased thickness of the bridge 286 or upper portion of the side wall can be approximately 0.040 inches across the width of the side wall between the stud guides 284. This may help the junction box 200J maintain its general or approximate rectangular shape during installation.

Furthermore, in certain embodiments, one or more stud markers 240 or stud guides can be positioned at certain portions of a junction box, such as on the side walls and adjacent to the corners of the box, to minimize deflection of the junction box when the box is mounted to a wall stud. This may also help the junction box 200J maintain its general or approximate rectangular shape during installation.

Moreover, the mountable junction box 200J can include an increased internal box volume over conventional junction boxes. In the embodiment shown in FIG. 7B, the mountable junction box 200J can include at least one radiused corner between at least one end wall and the lower wall. For example, adjacent to the end walls, the lower end walls can include radiused corners 288, which in turn, can increase the overall internal box volume 290 bounded by the end walls, side walls, front opening, and rear wall of the junction box 200J. In this manner, the internal box volume 290 can accommodate additional electrical components or otherwise facilitate easier consumer or user installation of electrical components within the box 200J. This may also help the junction box 200J maintain its general or approximate rectangular shape during installation.

In the embodiment shown in FIGS. 8-10, a mountable junction box 200B can include one or more brackets or a set of angled nail guides 242. As shown, the nail guides 242 can be mounted to the side walls of the junction box 200B, and can receive nails or other mounting devices to mount the junction box 200B to a face of a wall stud, such as 244. An optional face plate 246, shown in FIGS. 9 and 10, can be mounted to the junction box 200B to cover an associated opening of the junction box 200B.

Figure 11:
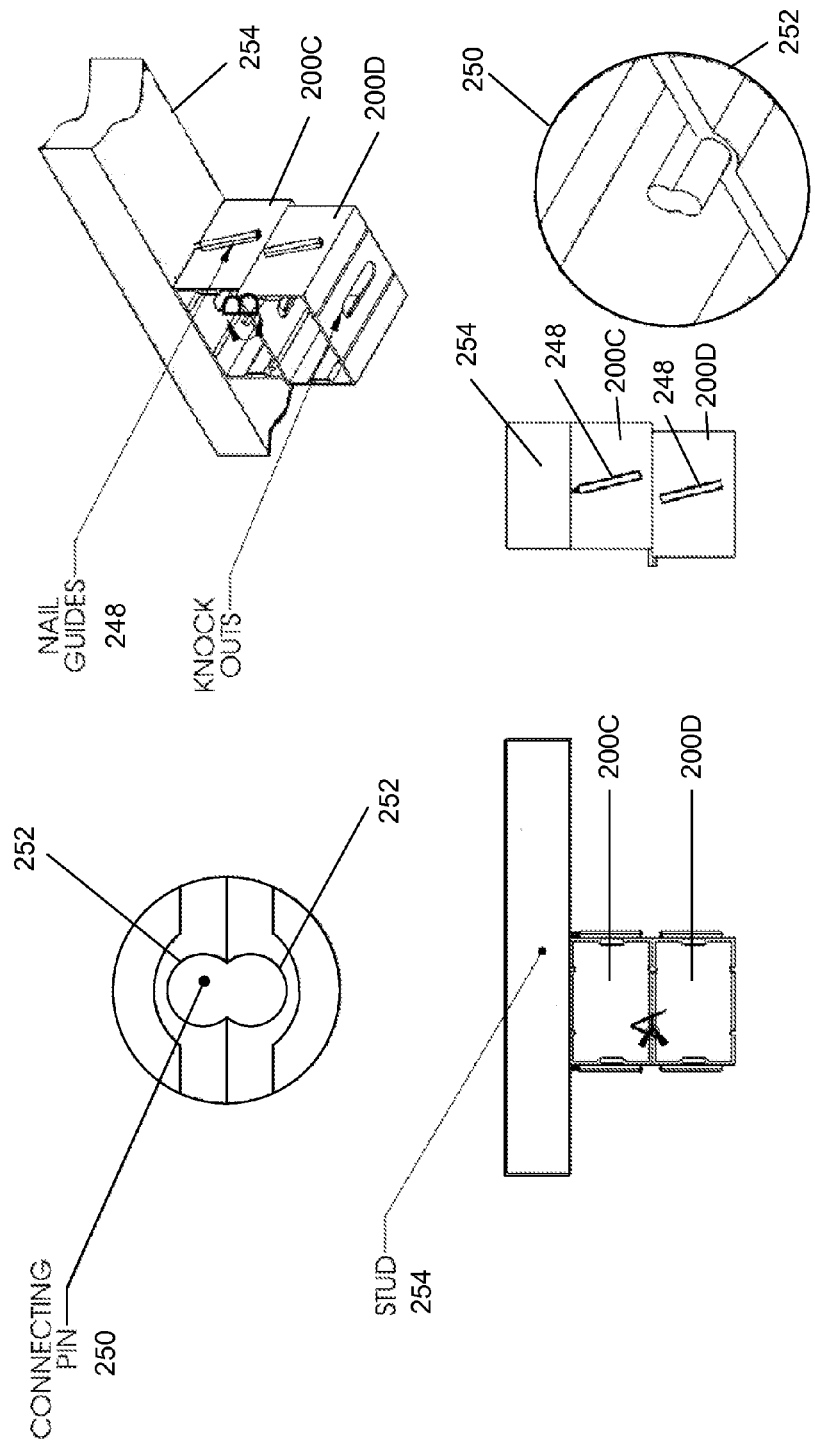
FIGS. 11-16 are various views of example mountable junction boxes in accordance with embodiments of the invention.

In the embodiments shown in FIGS. 11-16, a mountable junction box, such as 200C, 200D, 200E, 200F, 200G, 200H, 200I, 200J, 200K, 200L, 200M, 200N, can include one or more brackets or a set of angled nail guides 248. As shown in FIG. 11, the mountable junction box 200C can include a connecting device, such as a pin 250, to mount to and connect two junction boxes 200C, 200D together. Corresponding slots 252 in the side walls of the junction boxes 200C, 200D can facilitate insertion of the connecting device or pin 250 into the slot, wherein the junction boxes 200C, 200D can be mounted adjacent to each other when one junction box, such as 200C, is mounted to a wall stud, such as 254. Other embodiments can use any number of as well as different shapes, configurations, and locations of connecting devices, pins, and slots to mount two adjacent mountable junction boxes together.

Figure 12:
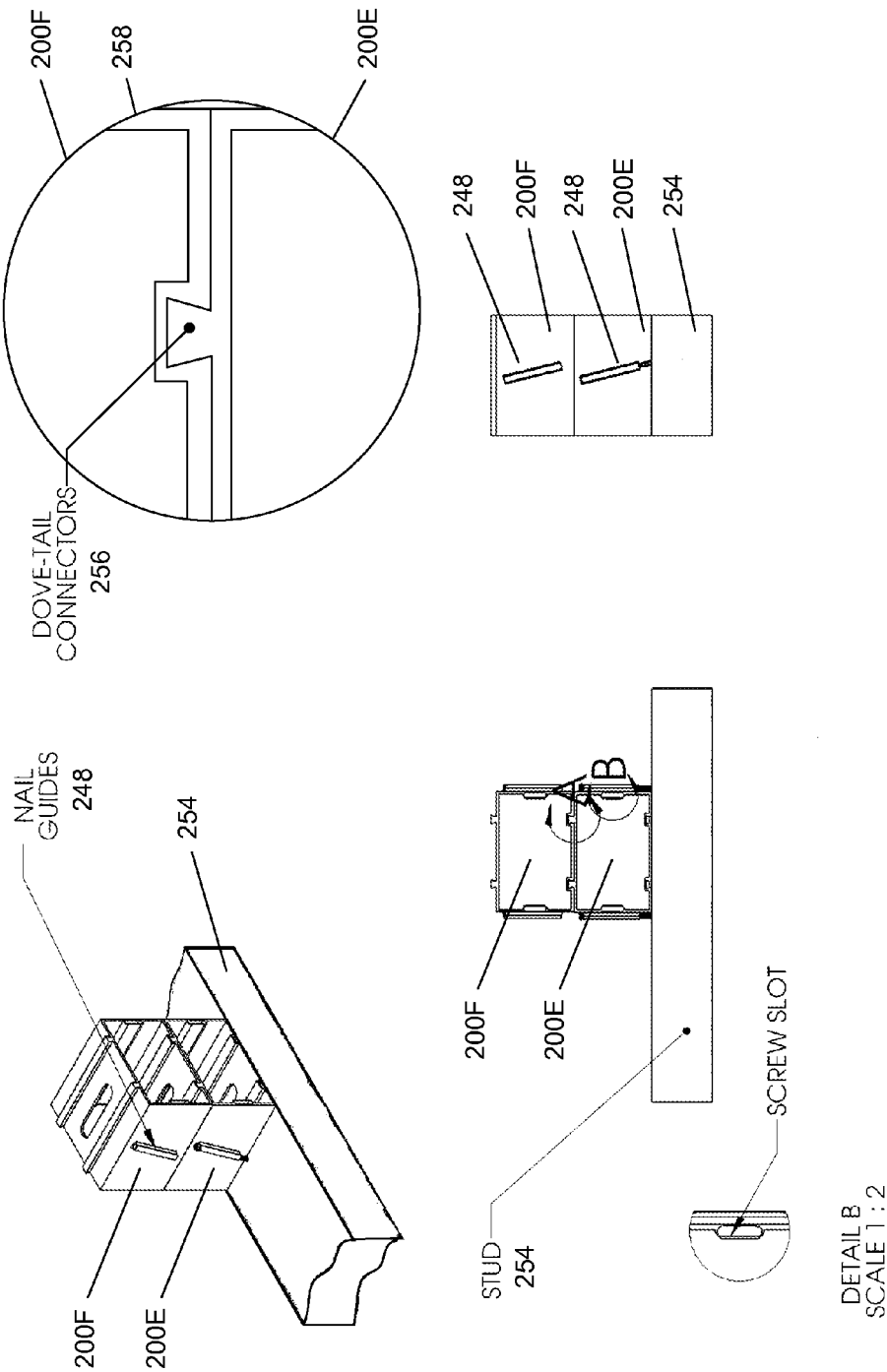

In another embodiment, such as in FIG. 12, a connecting device for a mountable junction box, such as 200E, can be a dovetail-shaped element, such as 256, which can be mounted to or otherwise formed in the side wall of the junction box 200E. A corresponding dovetail-shaped slot, such as 258, can be formed or otherwise machined in the side wall of another junction box, such as 200F, wherein the dovetail element 256 can be mounted within the slot 258 to mount the junction boxes 200E, 200F adjacent to each other when one junction box, such as 200E, is mounted to a wall stud, such as 254. Other embodiments can use any number of as well as different shapes, configurations, and locations of elements, dovetail-shaped elements, slots, and dovetail-shaped slots to mount two adjacent mountable junction boxes together.

Figure 13:
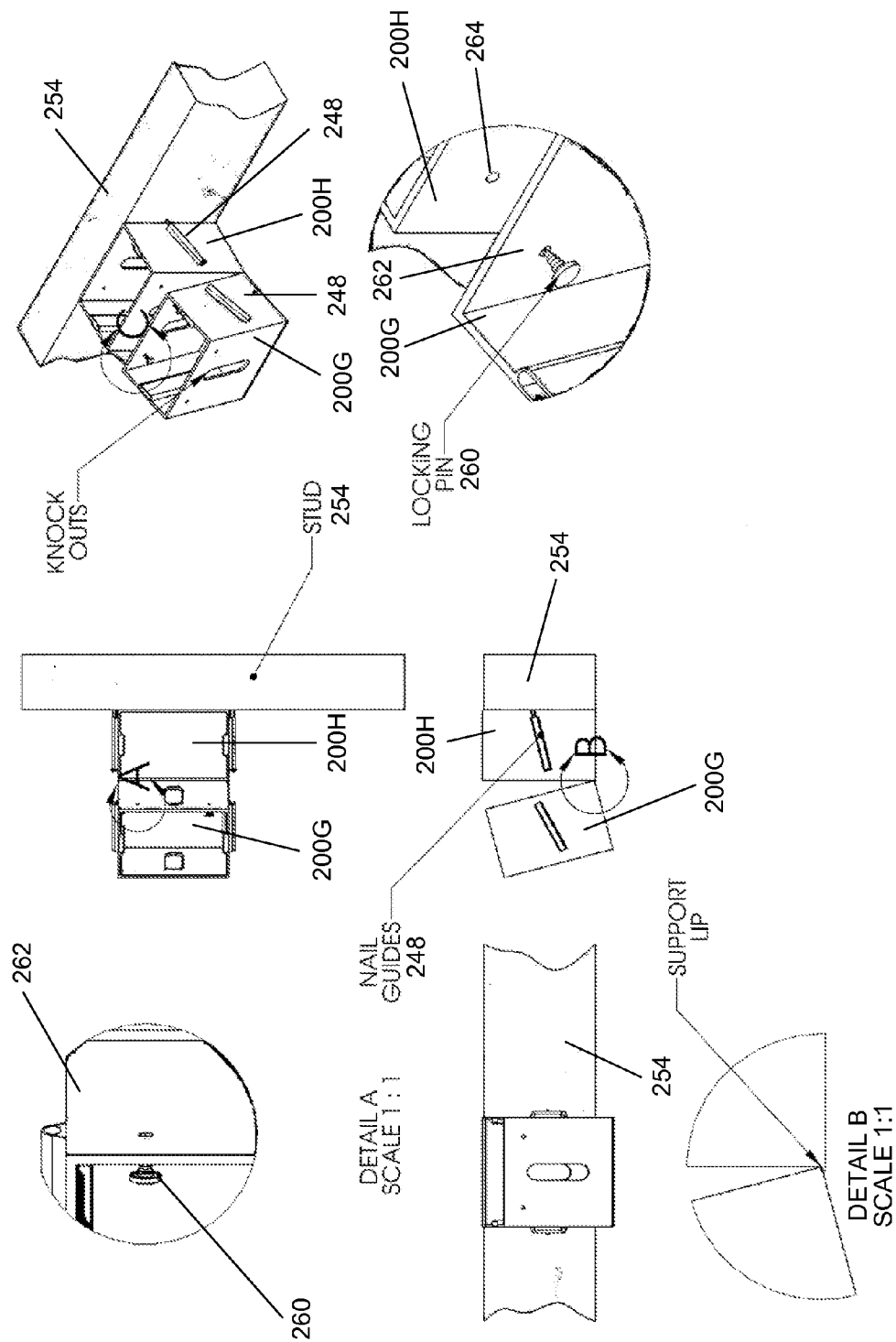

In another embodiment, such as in FIG. 13, a connecting device for a mountable junction box, such as 200G, can be a locking pin, such as 260, which can be mounted to or otherwise screwed into a corresponding hole, such as 262, in the side wall of the junction box 200G. A corresponding shaped nut or receiving hole, such as 264, can be formed in or otherwise mounted to the side wall of another junction box, such as 200H, wherein the locking pin 260 can be mounted within the holes 262, 264 to mount the junction boxes 200G, 200H adjacent to each other when one junction box, such as 200H, is mounted to a wall stud, such as 254. Other embodiments can use any number of as well as different shapes, configurations, and locations of locking pins, holes, and shaped nuts to mount two adjacent mountable junction boxes together.

Figure 14:
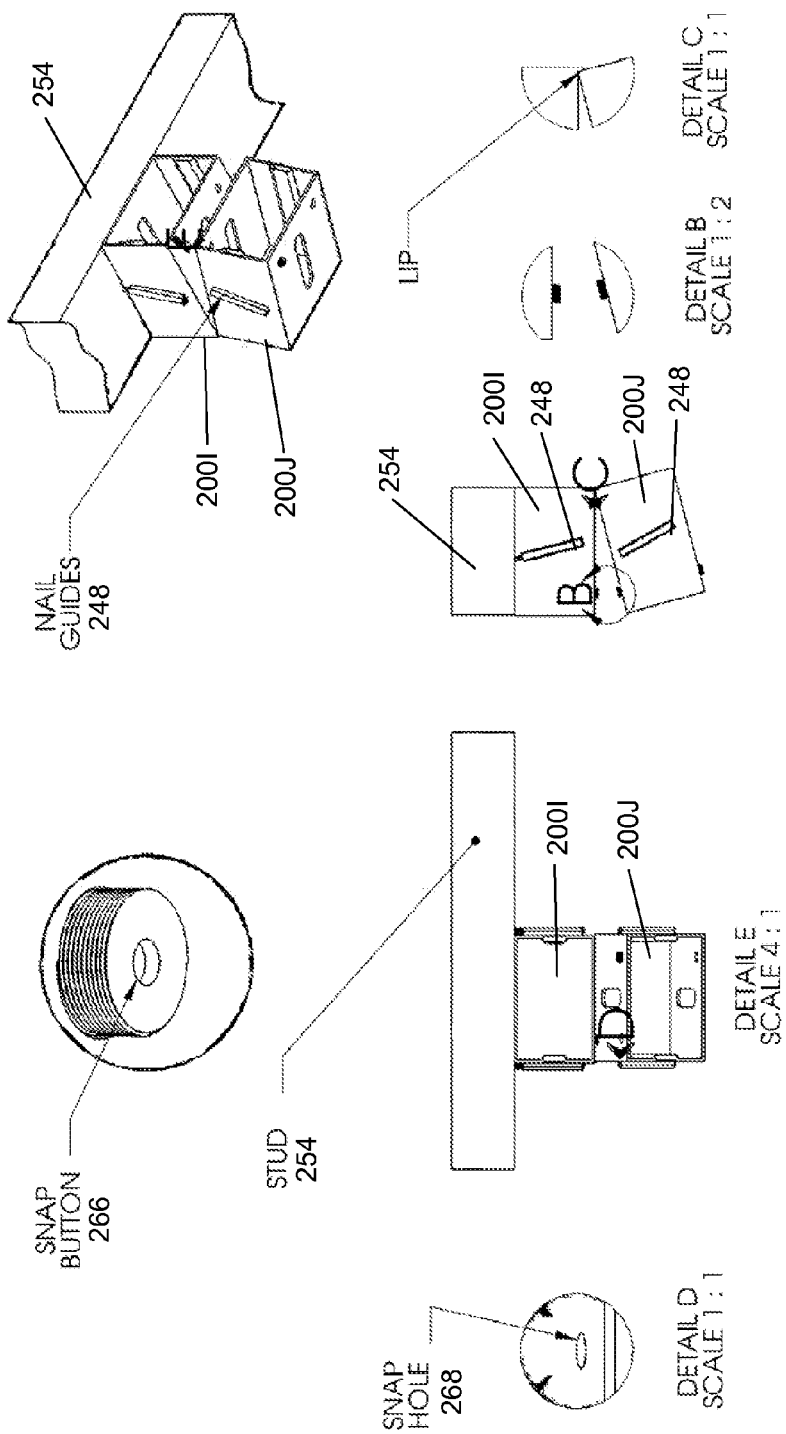

In another embodiment, such as in FIG. 14, a connecting device for a mountable junction box, such as 200I, can be a snap button, such as 266, which can be mounted to or otherwise formed on the side wall of the junction box 200I. A corresponding shaped receiving hole, such as 268, can be formed in or otherwise machined in the side wall of another junction box, such as 200J, wherein the snap button 266 can be mounted within the hole 268 to mount the junction boxes 200I, 200J adjacent to each other when one junction box, such as 200I, is mounted to a wall stud, such as 254. Other embodiments can use any number of as well as different shapes, configurations, and locations of snap buttons and holes to mount two adjacent mountable junction boxes together.

Figure 15:
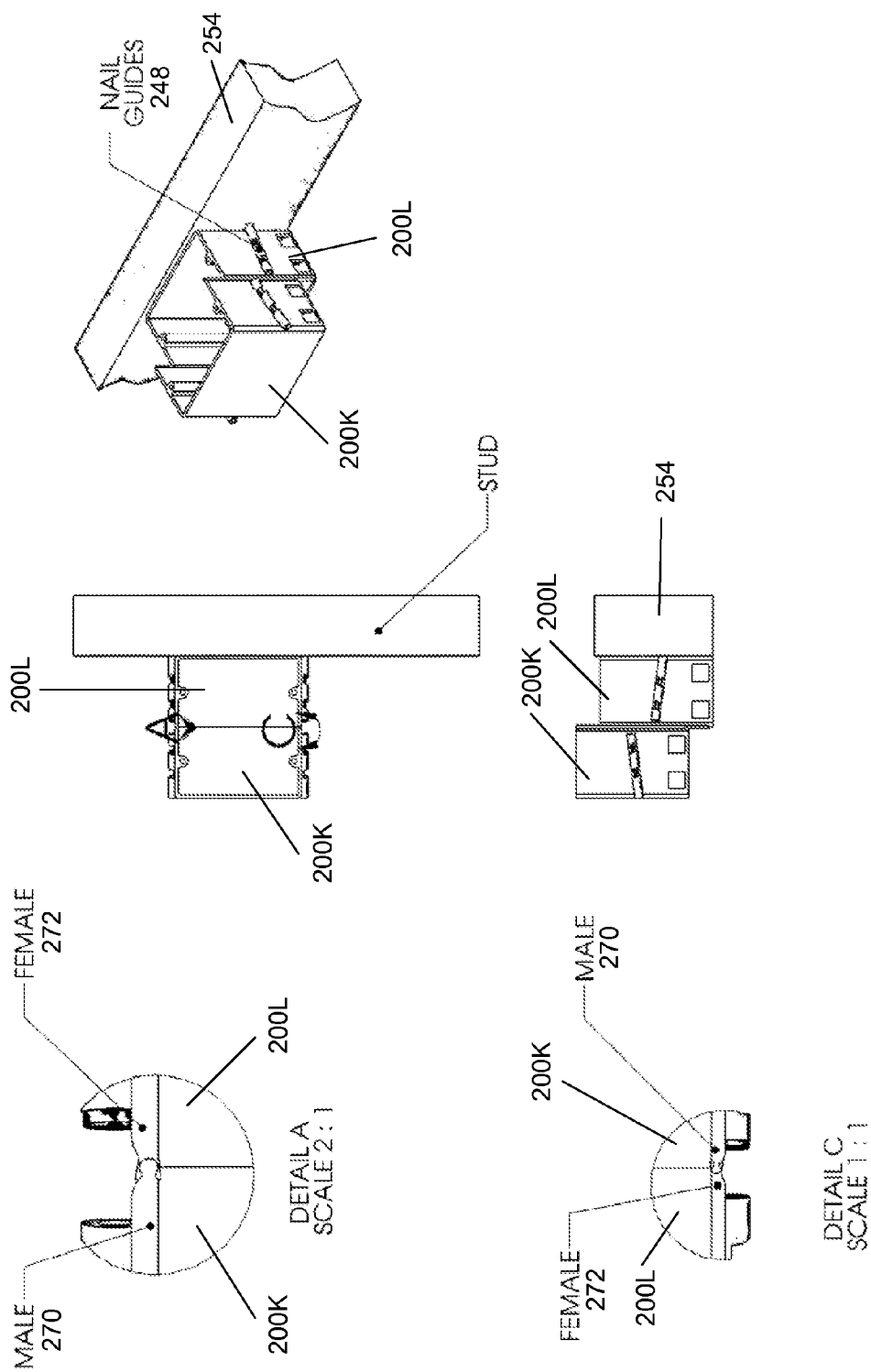

In another embodiment, such as in FIG. 15, a connecting device for a mountable junction box, such as 200K, can be a male-type protrusion or tongue, such as 270, which can be mounted to or otherwise formed in the side wall of and adjacent to the upper wall and/or lower wall of the junction box 200K. A corresponding female-type track or groove, such as 272, can be formed in or otherwise mounted to the side wall of and adjacent to the upper wall and/or lower wall of another junction box, such as 200L, wherein the male-type protrusion or tongue 270 can be mounted within the female-type track or groove 272 to mount the junction boxes 200K, 200L adjacent to each other when one junction box, such as 200L, is mounted to a wall stud, such as 254. Other embodiments can use any number of as well as different shapes, configurations, and locations of male-type protrusions, tongues, female-type tracks, and grooves to mount two adjacent mountable junction boxes together.

Figure 16:
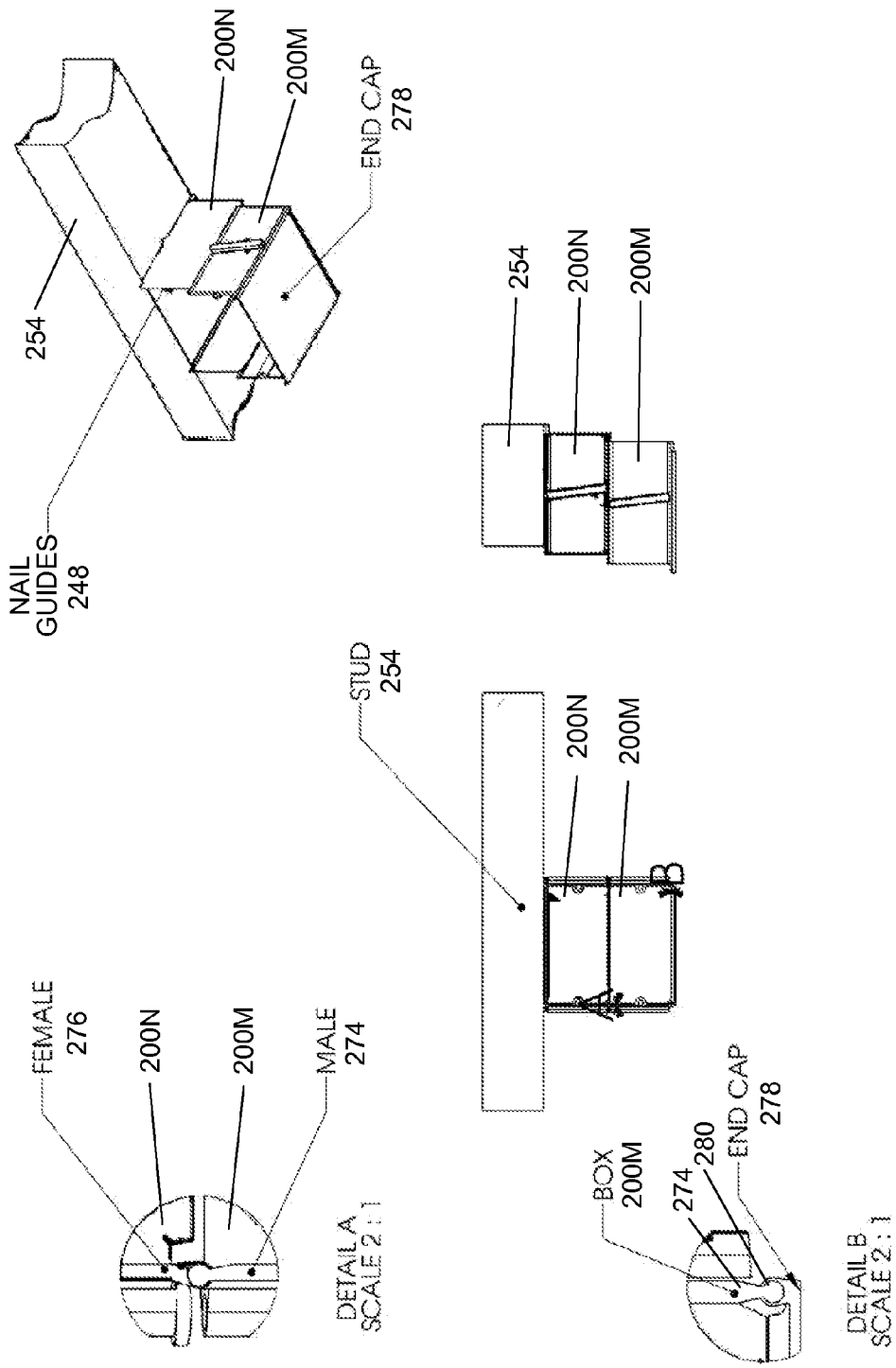

In another embodiment, such as in FIG. 16, a connecting device can be a male-type protrusion or tongue, such as 274, which can be mounted to or otherwise formed in the side wall of and adjacent to the upper wall and/or lower wall of a junction box, such as 200M. A corresponding female-type track or groove, such as 276, can be formed in or otherwise mounted to the side wall of and adjacent to the upper wall and/or lower wall of another junction box, such as 200N, wherein the male-type protrusion or tongue 274 can be mounted within the female-type track or groove 276 to mount the junction boxes 200M, 200N adjacent to each other when one junction box, such as 200N, is mounted to a wall stud, such as 254. An end cap 278 can be mounted to an open side of a junction box, such as 200M, via a tongue-and-groove type connector arrangement, wherein the end cap 278 includes a female-type track or groove 280 that can cooperate with and mount to a male-type protrusion or tongue, such as 274, associated with the junction box 200M. Other embodiments can use any number of as well as different shapes, configurations, and locations of male-type protrusions, tongues, female-type tracks, and grooves to mount two adjacent mountable junction boxes together.

Other embodiments and features of example mountable electrical junction boxes and/or accessories are described in FIGS. 22-40 below.

Figure 17:
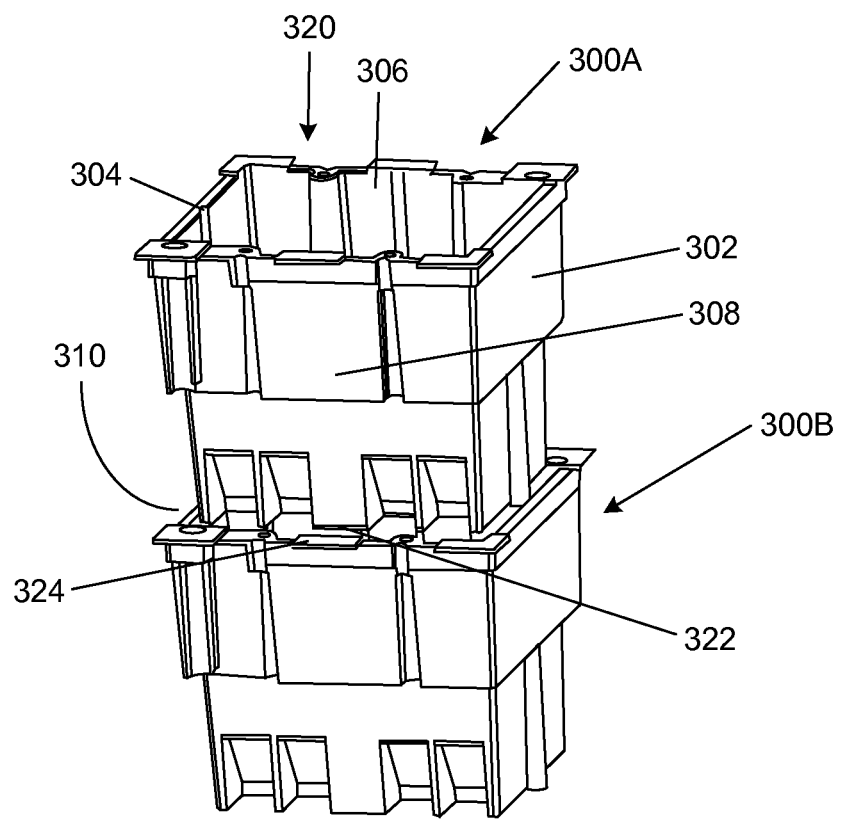
FIG. 17 is a side perspective view of example stackable junction boxes in accordance with an embodiment of the invention.

FIG. 17 is a perspective view of example stackable electrical junction boxes in accordance with an embodiment of the invention. A pair of identical electrical junction boxes 300A, 300B are shown in FIG. 17 in a stackable, aligned orientation. In the embodiment shown in FIG. 17, the electrical junction box 300A can include a rectangular-shaped housing that includes a pair of side walls 302, 304, an upper wall 306, a lower wall 308, and a rear wall 310. In certain embodiments, such as 300A in FIG. 17, one or more cable openings, clamps, punch outs, and mounting holes can be included. An opening 320 in the front portion of the junction box 300 is sized to receive an electrical component, such as a switch or outlet, which can be mounted within the junction box 300A, 300B via one or more screws secured within the mounting holes. Furthermore, the junction box 300 shown in FIG. 17 can include a stacking tab 322 mounted to an exterior surface of one side wall and a corresponding stacking notch 324 in an opposing side wall.

In the embodiment shown, the stacking tab 322 can be a rectangular-shaped block, and the corresponding stacking notch 324 can be rectangular-shaped channel or groove. In other embodiments, a stacking tab and corresponding stacking notch can have other designs, shapes, and configurations, such as a tongue and groove configuration. In other embodiments, a series of tabs and notches can be used.

When at least two junction boxes, such as 300A and 300B, are rotated about 180 degrees from each other, wherein the junction boxes are facing opposing directions, the junction boxes 300A, 300B can be stacked together as shown in FIG. 17. As shown, the stacking tab 322 of one junction box 300A can fit within the corresponding stacking notch 324 of the other junction box 300B. Other similarly shaped junction boxes similar to 300A and 300B can be stacked with the pair of stacked boxes 300A, 300B when the similarly shaped junction boxes are rotated about 180 degrees with respect to the adjacent stacked box 300A, 300B. In certain embodiments, a pair of junction boxes can be rotated at various angles between 0 and 180 degrees, such as 90 degrees with respect to each other, such that a stacking tab, similar to 322, cooperates with a stacking notch, such as 324, to facilitate nesting and stacking of one junction box within another junction box. In any instance, when the junction boxes 300A, 300B are similarly oriented, i.e., when the pair of junction boxes are not rotated with respect to each other, such as 0 degrees with respect to each other, the stacking tab 322 of at least one junction box, such as 300A, interferes with a notchless wall of the other junction box, such as 300B, thus preventing or otherwise inhibiting the stacking of the junction boxes 300A, 300B together. In this manner, in accordance with certain embodiments of the invention, multiple junction boxes can be transported and/or stored together while minimizing the space required by each respective unstacked junction box, and thereby can reduce the burden of carrying and/or storing multiple junction boxes together.

The junction boxes 300A, 300B shown in FIG. 17 is shown by way of example only, and other configurations, shapes, and designs can exist in accordance with other embodiments of the invention.

Figure 18:
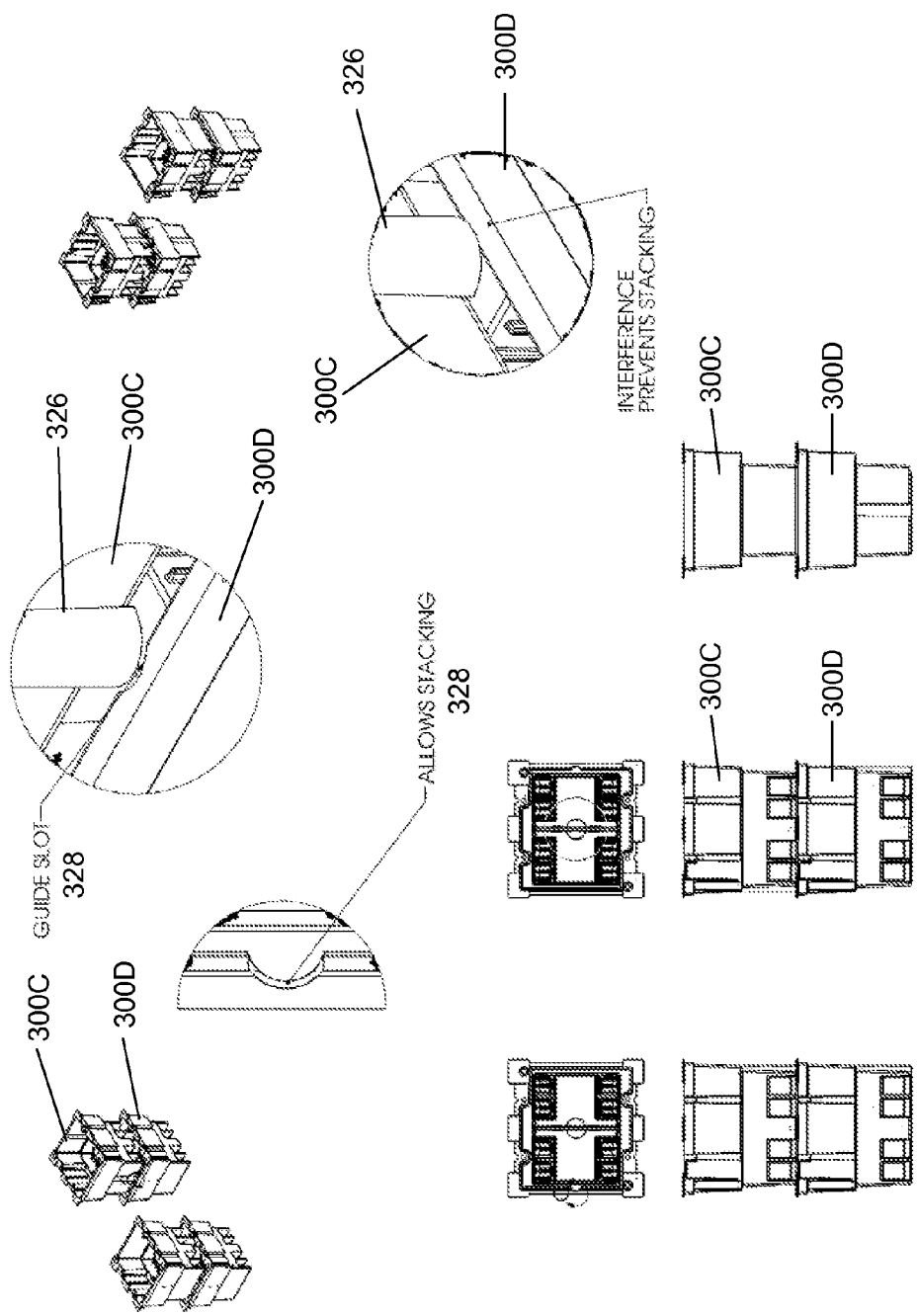
FIG. 18 is a series of views of example stackable junction boxes in accordance with an embodiment of the invention.

FIG. 18 is a series of views of example stackable electrical junction boxes in accordance with an embodiment of the invention. In the detail view shown in FIG. 18, a stacking tab 326 of one junction box 300C can fit within the corresponding stacking notch 328 of the other junction box 300D. In this manner, when the junction boxes 300C is rotated about 180 degrees with respect to the adjacent junction box 300D, a portion of the junction box 300C can be nested within a portion of the junction box 300D, thus facilitating stacking of the junction boxes 300C, 300D. When the junction boxes 300C, 300D are similarly oriented, interference between the stacking tab 326 of at least one junction box, such as 300C, and a notchless wall of the other junction box, such as 300D, can prevent or otherwise inhibit the stacking of the similarly oriented junction boxes 300C, 300D together.

Figure 19:
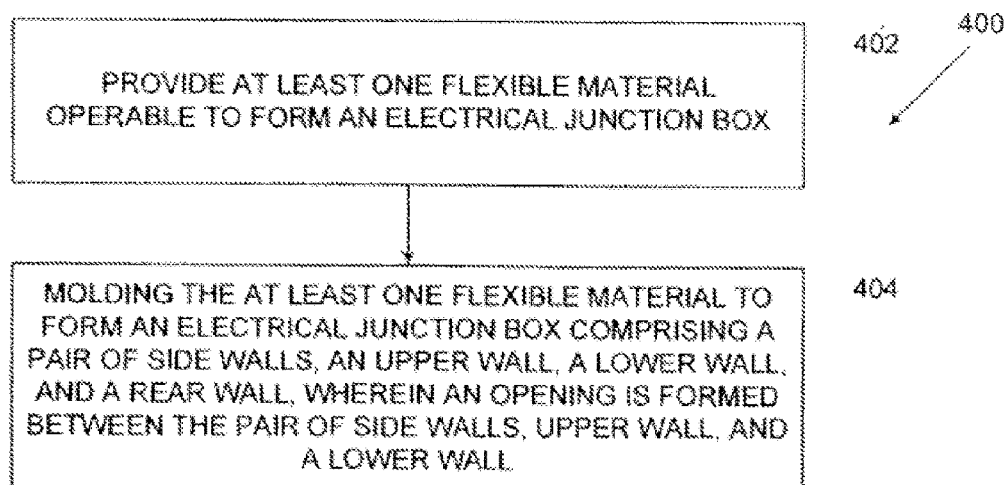
FIGS. 19-21 are example methods in accordance with embodiments of the invention.
Figure 20:
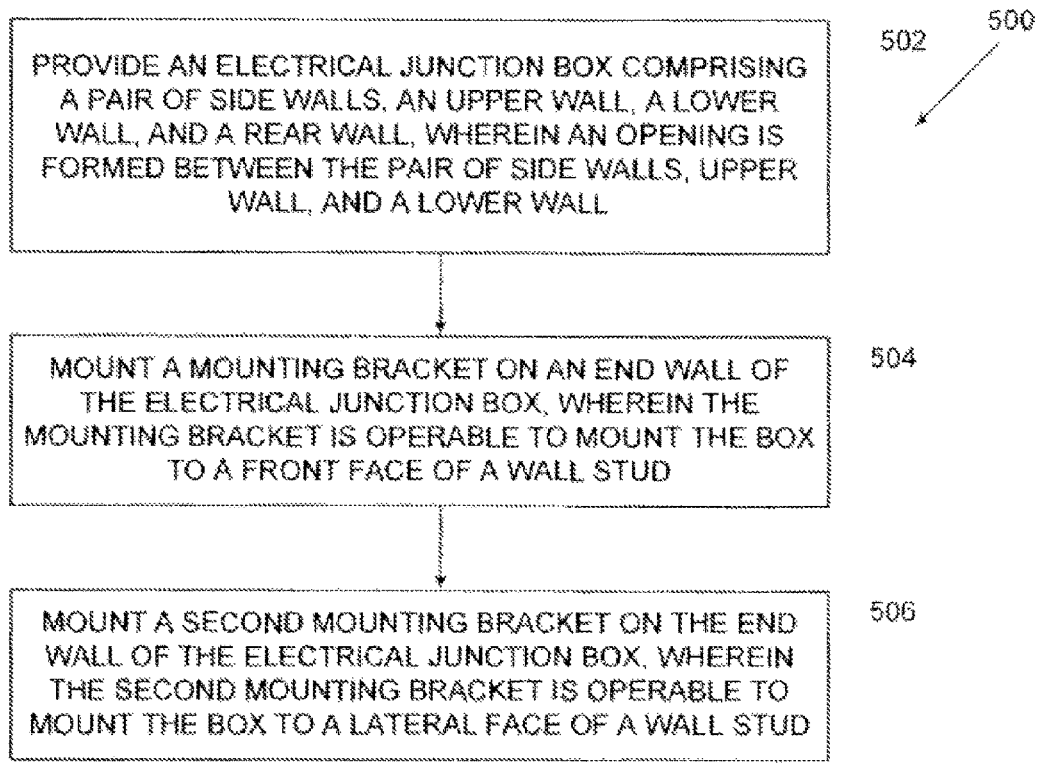
Figure 21:
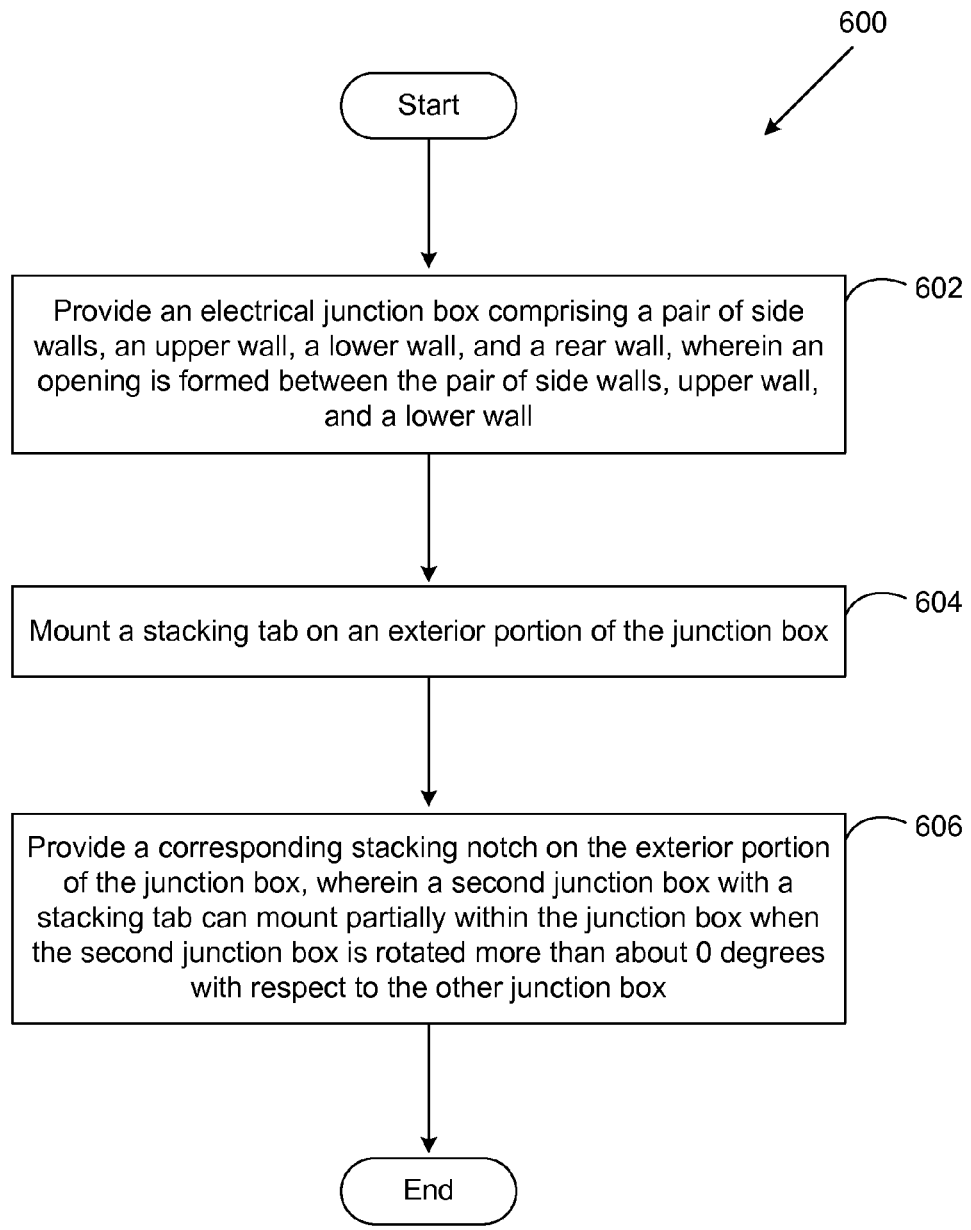

FIGS. 19-21 illustrate various example methods of manufacturing and/or using the junction boxes and/or accessories, such as 100, 200, 300 illustrated above. Each of the flowcharts 400, 500, 600 shown in FIGS. 19, 20, and 21, respectively, are shown by way of example only, and can have fewer or greater numbers of elements than shown.

In FIG. 19, an example method for manufacturing an electrical junction box or electrical accessory is shown. The method 400 begins at block 402. In block 402, at least one flexible material operable to form an electrical junction box is provided.

Block 402 is followed by block 404, in which the at least one flexible material is molded to form an electrical junction box or electrical accessory comprising a pair of side walls, an upper wall, a lower wall, and a rear wall, wherein an opening is formed between the pair of side walls, an upper wall, and a lower wall.

Example electrical junction boxes or electrical accessories created by an embodiment of the method 400 shown in FIG. 19 are illustrated in FIGS. 1-5.

The method 400 ends at block 404.

In FIG. 20, another example method for manufacturing an electrical junction box or electrical accessory is shown. The method 500 begins at block 502. In block 502, at least one electrical junction box comprising a pair of side walls, an upper wall, a lower wall, and a rear wall is provided, wherein an opening is formed between the pair of side walls, an upper wall, and a lower wall.

Block 502 is followed by block 504, in which a mounting bracket is mounted on an end wall of the electrical junction box, wherein the mounting bracket is operable to mount the box to a front face of a wall stud.

Block 504 is followed by block 506, in which a second mounting bracket is mounted to the end wall of the electrical junction box, wherein the second mounting bracket is operable to mount the box to a lateral face of a wall stud.

Example electrical junction boxes created by an embodiment of the method 500 shown in FIG. 20 are illustrated in FIGS. 6A, 6B, 7A, 7B, and 8-16.

The method 500 ends at block 506.

In FIG. 21, another example method for manufacturing an electrical junction box or electrical accessory is shown. The method 600 begins at block 602. In block 602, at least one electrical junction box comprising a pair of side walls, an upper wall, a lower wall, and a rear wall is provided, wherein an opening is formed between the pair of side walls, an upper wall, and a lower wall.

Block 602 is followed by block 604, in which a stacking tab on an exterior portion of the junction box is provided.

Block 604 is followed by block 606, in which a corresponding stacking notch on the exterior portion of the junction box is provided, wherein a second junction box with a stacking tab can mount partially within the junction box when the second junction box is rotated more than about 0 degrees with respect to the other junction box.

Example electrical junction boxes or electrical accessories created by an embodiment of the method 600 shown in FIG. 21 are illustrated in FIGS. 17-18.

The method 600 ends at block 606.

Figure 22:
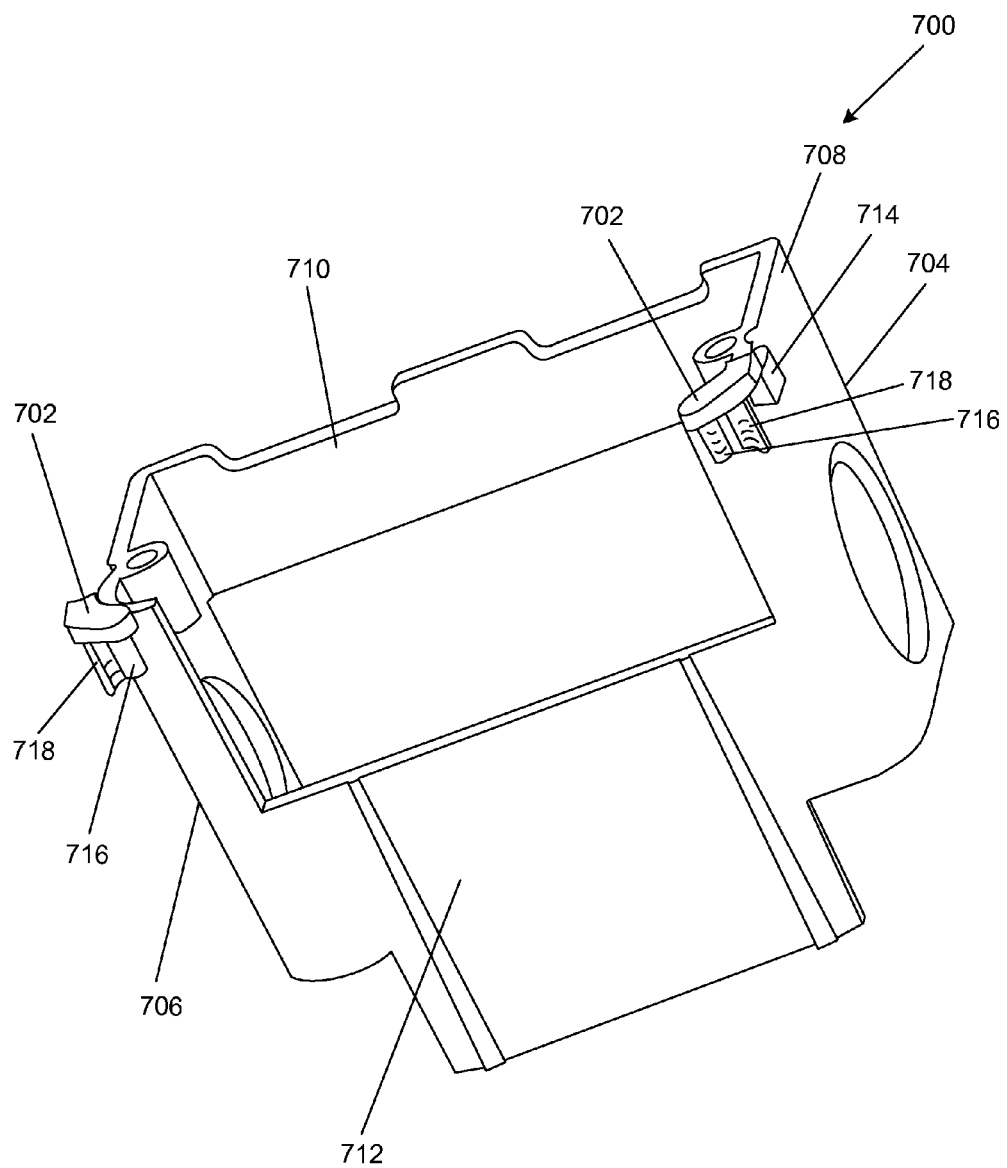
FIG. 22 is a perspective view of another example mountable junction box or electrical accessory in accordance with an embodiment of the invention.

In the embodiment shown in FIG. 22, an embodiment of an electrical accessory 700 is illustrated. The electrical accessory 700 shown can include at least one locating and positioning arm 702 mounted to a molded frame 704, which can be mounted to one or more corners of an existing or adjacent junction box or electrical accessory for low voltage use. This embodiment can incorporate a locating and positioning arm 702 extending from the upper and lower surfaces or end walls 706, 708 of the frame. When the locating and positioning arm 702 is fitted over the corners of an existing or adjacent junction box or electrical accessory, the existing or adjacent junction box or electrical accessory can be held relative to the molded frame 704.

As shown in FIG. 22, the upper end wall 706 and lower end wall 708 are disposed in substantially parallel relation to each other. A pair of side walls 710, 712 disposed in substantially parallel relation to each other, are each further disposed between the two end walls. The locating and positioning arms 702 are shown mounted to at least one of the end walls, such as 706 and 708. Each of the locating and positioning arms 702 includes a support leg 714 mounted to the corresponding end wall 706, 708, and a respective prong 716 substantially perpendicular to the corresponding locating and positioning arm 702. In this manner, a side wall portion of an adjacent junction box or electrical accessory can be positioned between the prongs 716 and side wall 712 of the electrical accessory 700. In certain other embodiments, the locating and positioning arms and associated prongs can be smaller or larger, and may have different dimensions or shapes.

In one embodiment, a support leg of the locating and positioning arms can include an initial portion operable to mount to at least one of the end walls, an angled portion which extends outward from the initial portion and the frame, and an extension from the angled portion which overhangs an adjacent region for mounting the adjacent electrical accessory between at least one prong and at least one side wall.

In the embodiment shown in FIG. 22, at least one stop tab such as 718 can be mounted to the locating and positioning arms 702. As shown in FIG. 22, each stop tab can be a slightly curved or arcuate piece of material extending from each locating and positioning arms 702. The curvature of the stop tab can be operable to accommodate the corresponding exterior shape of an adjacent junction box or electrical accessory to be positioned adjacent to the electrical accessory 700 or frame 704. Each of the stop tabs 718 shown can be operable to contact an adjacent junction box or electrical accessory when the adjacent junction box or electrical accessory is positioned between the prongs 716 and the side wall 712 of the electrical accessory 700. In certain other embodiments, the stop tabs can be smaller or larger, and may have different dimensions or shapes.

For instance, in at least one embodiment, at least one stop tab can be mounted to at least one side wall or one end wall of the frame or electrical accessory. For example, instead of a stop tab mounted to the locating and positioning arm such as 702, one or more stop tabs can be mounted to the side wall, such as 712, or one end wall of the frame, such as 704, or electrical accessory, such as 700. In any instance, each stop tab is operable to contact an adjacent electrical accessory when the adjacent electrical accessory is positioned between the prongs 716 and side wall 712 of the electrical accessory 700.

The junction box and/or electrical accessory 700 shown in FIG. 22 is shown by way of example only, and other configurations, shapes, and designs can exist in accordance with other embodiments of the invention.

Figure 23:
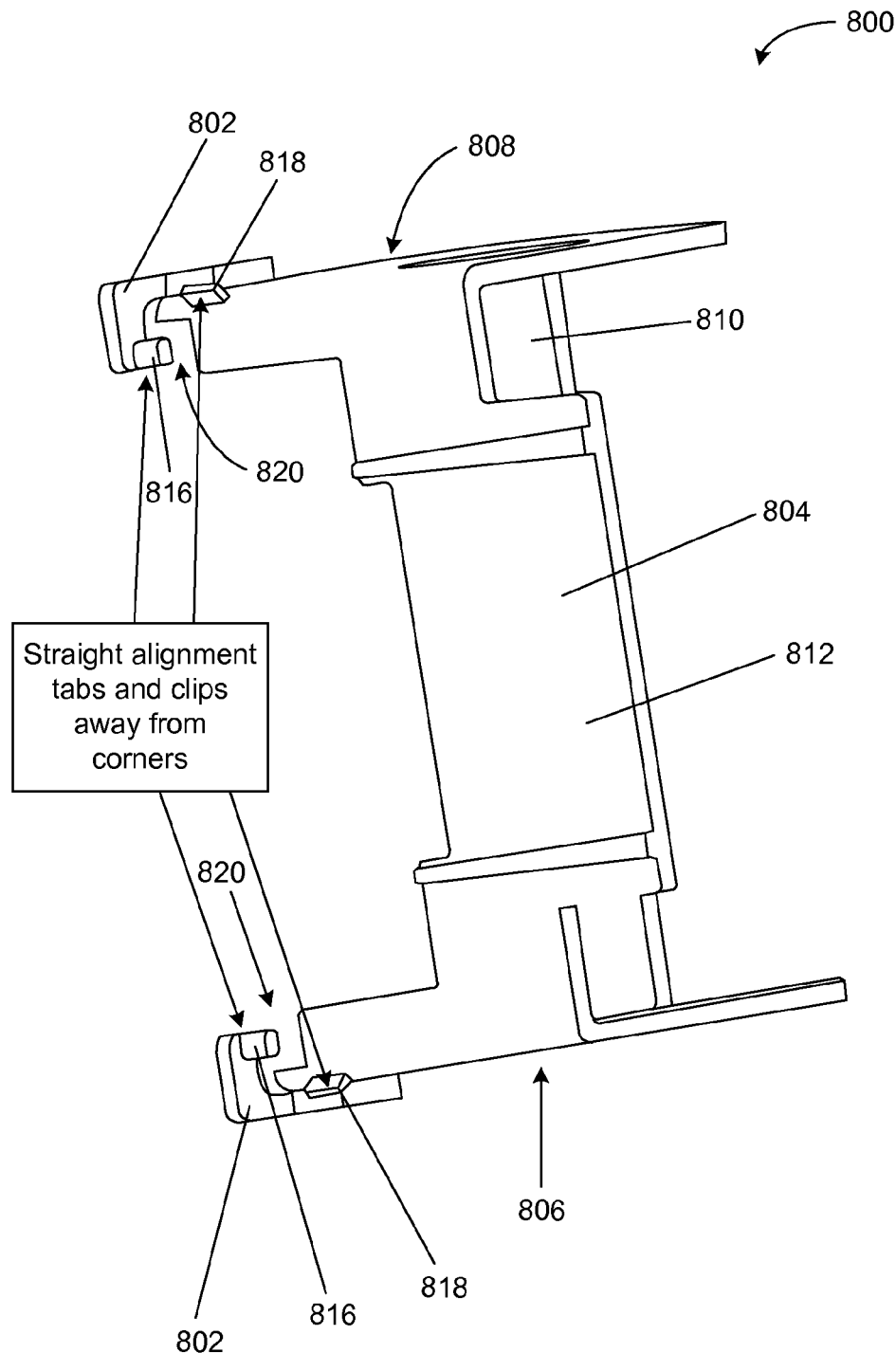
FIG. 23 is a front side perspective view of another example mountable electrical accessory in accordance with an embodiment of the invention.
Figure 24:
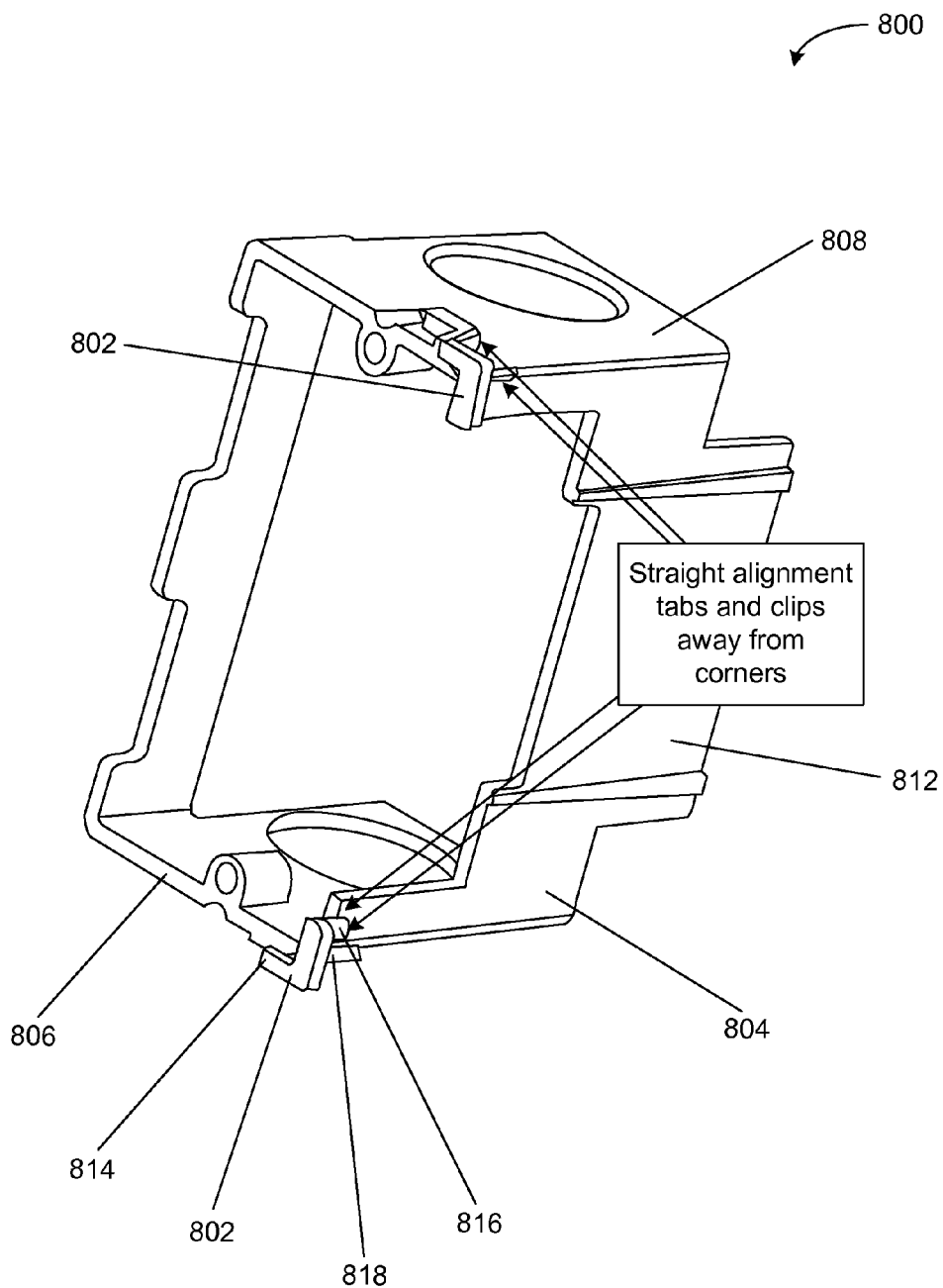
FIG. 24 is a front overhead perspective view of another example mountable electrical accessory in accordance with an embodiment of the invention.
Figure 25:
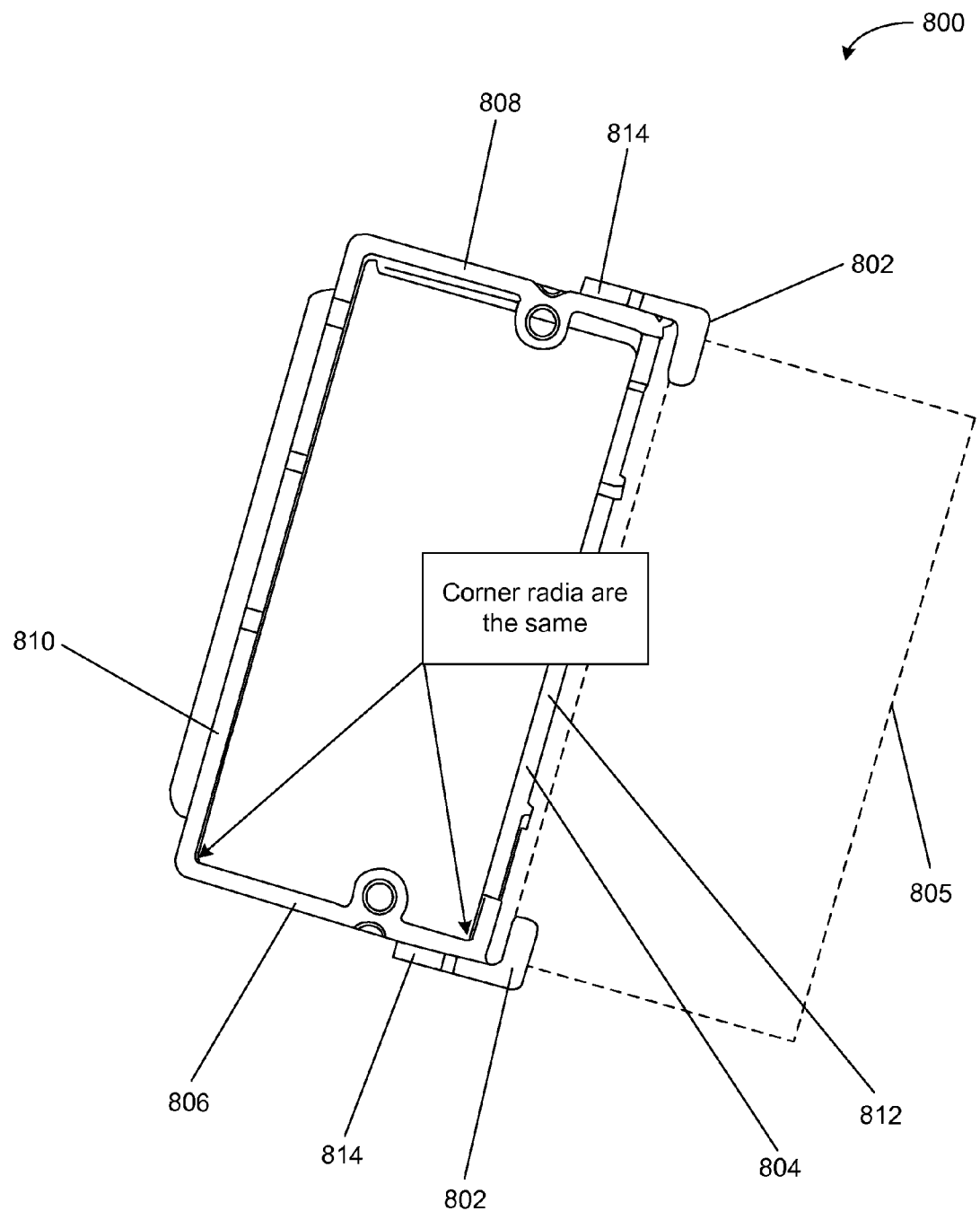
FIG. 25 is an upper view of the example mountable electrical accessory in FIG. 24.
Figure 26:
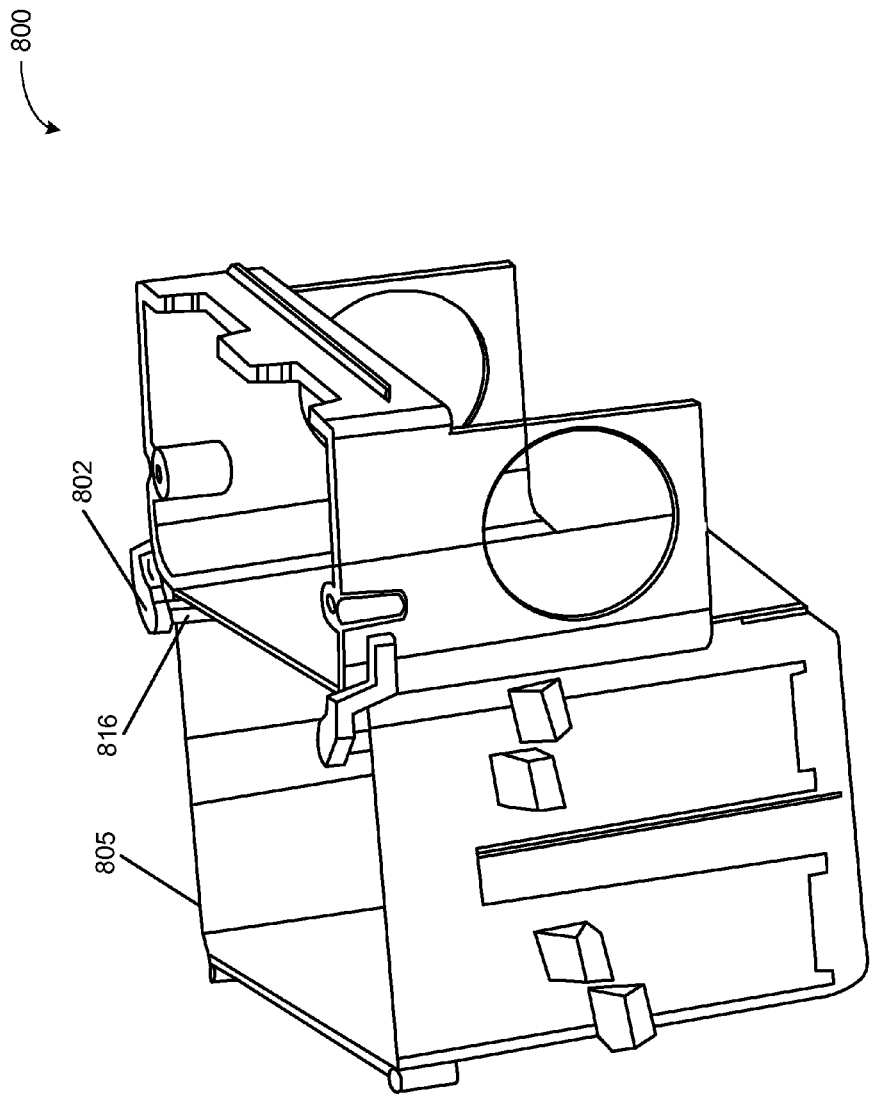
FIG. 26 is a side perspective view of the mountable electrical accessory shown in FIG. 24 with a junction box mounted adjacent to the electrical accessory in accordance with an embodiment of the invention.

In the embodiments shown in FIGS. 23-26, an example electrical accessory 800 is illustrated. The electrical accessory 800 shown can include at least one locating and positioning arm 802 mounted to a molded frame 804, which can be mounted to one or more corners of an existing or adjacent junction box or electrical accessory for low voltage use. For instance, FIG. 26 is a side perspective view of the mountable electrical accessory shown in FIG. 24 with a junction box 805 mounted adjacent to the electrical accessory 800 in accordance with an embodiment of the invention. This embodiment, as shown in FIG. 23, can incorporate a locating and positioning arm 802 extending from the upper and lower surfaces or end walls 806, 808 of the frame. When the locating and positioning arm 802 is fitted over the corners of an existing or adjacent junction box or electrical accessory, the existing or adjacent junction box or electrical accessory can be held relative to the molded frame 804. In certain other embodiments, the locating and positioning arms and associated prongs can be smaller or larger, and may have different dimensions or shapes.

As shown in FIGS. 23-25, the upper end wall 806 and lower end wall 808 are disposed in substantially parallel relation to each other. A pair of side walls 810, 812 disposed in substantially parallel relation to each other, are each further disposed between the two end walls. The locating and positioning arms 802 are shown mounted to at least one of the end walls, such as 806 and 808. Each of the locating and positioning arms 802 includes a support leg 814 mounted to the corresponding end wall 806, 808, and a respective prong 816 substantially perpendicular to the corresponding locating and positioning arm 802. In this manner, a side wall portion of an adjacent junction box or electrical accessory can be positioned between the prongs 816 and side wall 812 of the electrical accessory 800.

In one embodiment, a support leg of the locating and positioning arms can include an initial portion operable to mount to at least one of the end walls, an angled portion which extends outward from the initial portion and the frame, and an extension from the angled portion which overhangs an adjacent region for mounting the adjacent electrical accessory between at least one prong and at least one side wall.

In the embodiments shown in FIGS. 23-25, at least one stop tab such as 818 can be mounted to the side wall and/or end wall of the electrical accessory 800 away from the locating and positioning arm 802. As shown in FIGS. 23 and 24, each stop tab can be a relatively small piece of material extending from the side wall and/or end wall. The stop tab can be operable to contact the exterior of an adjacent junction box or electrical accessory to be positioned adjacent to the electrical accessory 800 or frame 804, or in some instances, can be shaped to accommodate the corresponding exterior shape of an adjacent junction box or electrical accessory to be positioned adjacent to the electrical accessory 800 or frame 804. Each of the stop tabs 818 shown can be operable to contact an adjacent junction box or electrical accessory when the adjacent junction box or electrical accessory is positioned between the prongs 816 and the side wall 812 of the electrical accessory 800. In certain other embodiments, the stop tabs can be smaller or larger, and may have different dimensions or shapes.

In at least one embodiment, such as in FIG. 23, at least one notch such as 820A, 820B in at least one of the side walls can be operable to accommodate an adjacent junction box or electrical accessory when the adjacent junction box or electrical accessory is positioned between the prongs 816 and the side wall 812 of the electrical accessory 800. For example, the at least one notch 820A, 820B can be adjacent to the prongs 816 of the electrical accessory 800, wherein the at least one notch can accommodate the upper portion of the side wall of the adjacent junction box or electrical accessory. In certain other embodiments, the notch can be smaller or larger, and may have different dimensions or shapes.

The junction boxes and/or electrical accessories 800 shown in FIGS. 23-26 are shown by way of example only, and other configurations, shapes, and designs can exist in accordance with other embodiments of the invention.

Figure 27:
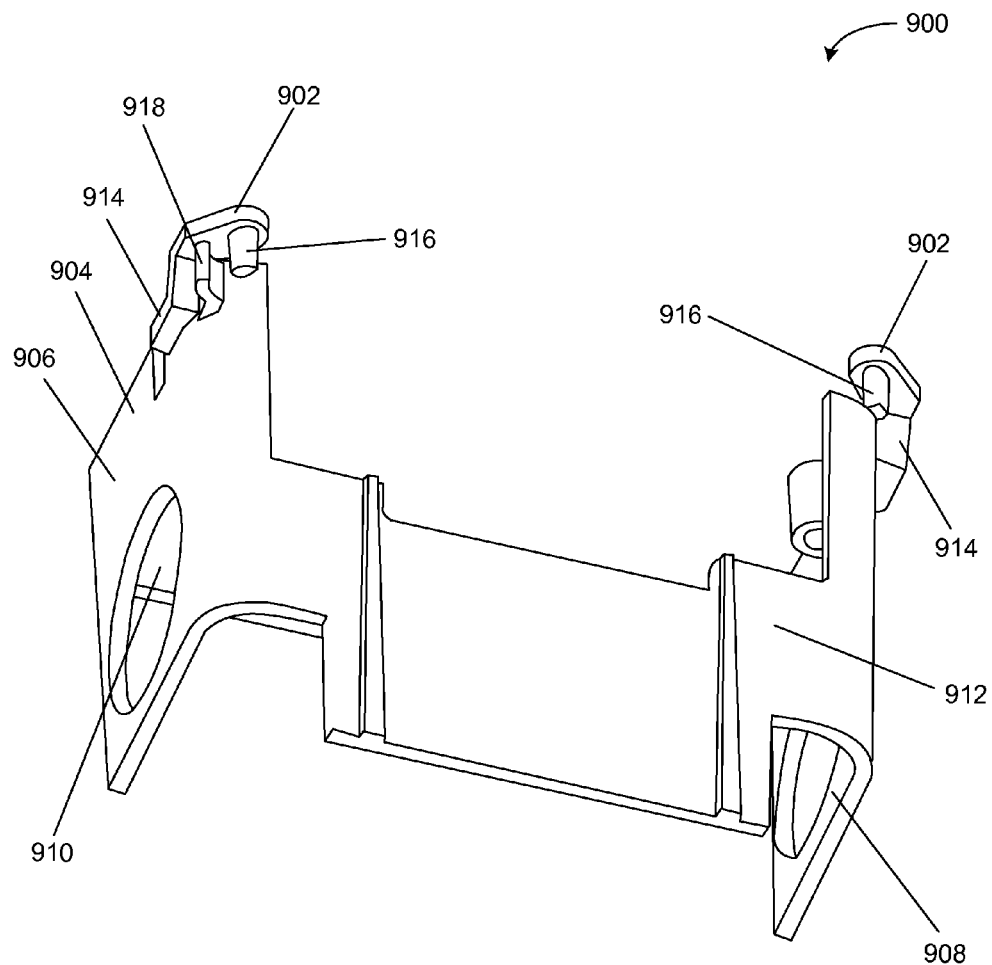
FIG. 27 is a lower front side perspective view of another example mountable electrical accessory in accordance with an embodiment of the invention.

In the embodiment shown in FIG. 27, another embodiment of an electrical accessory 900 is illustrated. The electrical accessory 900 shown can include at least one locating and positioning arm 902 mounted to a molded frame 904, which can be mounted to one or more corners of an existing or adjacent junction box or electrical accessory for low voltage use. This embodiment can incorporate a locating and positioning arm 902 extending from the upper and lower surfaces or end walls 906, 908 of the frame. When the locating and positioning arm 902 is fitted over the corners of an existing or adjacent junction box or electrical accessory, the existing or adjacent junction box or electrical accessory can be held relative to the molded frame 904.

As shown in FIG. 27, the upper end wall 906 and lower end wall 908 are disposed in substantially parallel relation to each other. A pair of side walls 910, 912 disposed in substantially parallel relation to each other, are each further disposed between the two end walls. The locating and positioning arms 902 are shown mounted to at least one of the end walls, such as 906 and 908. Each of the locating and positioning arms 902 includes a support leg 914 mounted to the corresponding end wall 906, 908, and a respective prong 916 substantially perpendicular to the corresponding locating and positioning arm 902. In this manner, a side wall portion of an adjacent junction box or electrical accessory can be positioned between the prongs 916 and side wall 912 of the electrical accessory 900. In certain other embodiments, the locating and positioning arms and associated prongs can be smaller or larger, and may have different dimensions or shapes.

In one embodiment, a support leg of the locating and positioning arms can include an initial portion operable to mount to at least one of the end walls, an angled portion which extends outward from the initial portion and the frame, and an extension from the angled portion which overhangs an adjacent region for mounting the adjacent electrical accessory between at least one prong and at least one side wall.

In the embodiment shown in FIG. 27, at least one stop tab such as 918 can be mounted to the side wall and/or end wall of the electrical accessory 900 away from but in close proximity to the locating and positioning arm 902. As shown in FIG. 27, the stop tab can be a relatively small piece of material extending from the side wall and/or end wall. The stop tab can be operable to contact the exterior of an adjacent junction box or electrical accessory to be positioned adjacent to the electrical accessory 900 or frame 904, or in some instances, can be shaped to accommodate the corresponding exterior shape of an adjacent junction box or electrical accessory to be positioned adjacent to the electrical accessory 900 or frame 904. The stop tab 918 shown can be operable to contact an adjacent junction box or electrical accessory when the adjacent junction box or electrical accessory is positioned between the prongs 916 and the side wall 912 of the electrical accessory 900. In certain other embodiments, the stop tab can be smaller or larger, and may have different dimensions or shapes.

In at least one embodiment, at least one notch in at least one of the side walls can be operable to accommodate an adjacent junction box or electrical accessory when the adjacent junction box or electrical accessory is positioned between the prongs 916 and the side wall 912 of the electrical accessory 900.

The junction box and/or electrical accessory 900 shown in FIG. 27 is shown by way of example only, and other configurations, shapes, and designs can exist in accordance with other embodiments of the invention.

Figure 28:
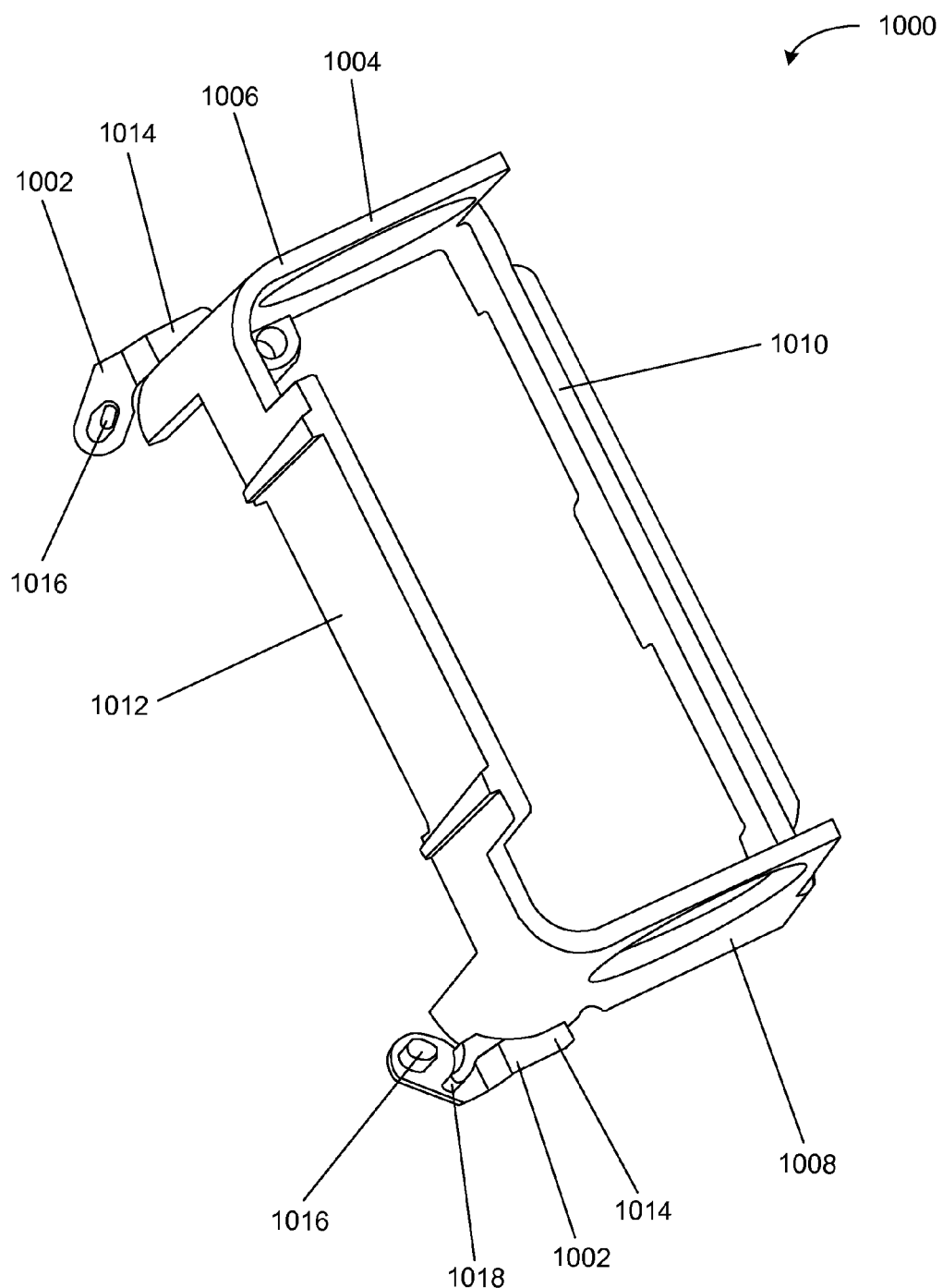
FIG. 28 is a bottom side perspective view of another example mountable electrical accessory in accordance with an embodiment of the invention.

In the embodiment shown in FIG. 28, another embodiment of an electrical accessory 1000 is illustrated. The electrical accessory 1000 shown can include at least one locating and positioning arm 1002 mounted to a molded frame 1004, which can be mounted to one or more corners of an existing or adjacent junction box or electrical accessory for low voltage use. This embodiment can incorporate a locating and positioning arm 1002 extending from the upper and lower surfaces or end walls 1006, 1008 of the frame. When the locating and positioning arm 1002 is fitted over the corners of an existing or adjacent junction box or electrical accessory, the existing or adjacent junction box or electrical accessory can be held relative to the molded frame 1004.

As shown in FIG. 28, the upper end wall 1006 and lower end wall 1008 are disposed in substantially parallel relation to each other. A pair of side walls 1010, 1012 disposed in substantially parallel relation to each other, are each further disposed between the two end walls. The locating and positioning arms 1002 are shown mounted to at least one of the end walls, such as 1006 and 1008. Each of the locating and positioning arms 1002 includes a support leg 1014 mounted to the corresponding end wall 1006, 1008, and a respective prong 1016 substantially perpendicular to the corresponding locating and positioning arm 1002. In this manner, a side wall portion of an adjacent junction box or electrical accessory can be positioned between the prongs 1016 and side wall 1012 of the electrical accessory 1000. In certain other embodiments, the locating and positioning arms and associated prongs can be smaller or larger, and may have different dimensions or shapes.

In the embodiment shown in FIG. 28, at least one stop tab such as 1018 can be mounted to a lower portion of at least one of the locating and positioning arms 1002 away from but in close proximity to the side wall and/or end wall. As shown in FIG. 28, the stop tab can be a relatively small piece of material extending from the locating and positioning arm 1002. The stop tab can be operable to contact the exterior of an adjacent junction box or electrical accessory to be positioned adjacent to the electrical accessory 1000 or frame 1004, or in some instances, can be shaped to accommodate the corresponding exterior shape of an adjacent junction box or electrical accessory to be positioned adjacent to the electrical accessory 1000 or frame 1004. The stop tab 1018 shown can be operable to contact an adjacent junction box or electrical accessory when the adjacent junction box or electrical accessory is positioned between the prongs 1016 and the side wall 1012 of the electrical accessory 1000. In certain other embodiments, the stop tab can be smaller or larger, and may have different dimensions or shapes.

In at least one embodiment, at least one notch in at least one of the side walls can be operable to accommodate an adjacent junction box or electrical accessory when the adjacent junction box or electrical accessory is positioned between the prongs 1016 and the side wall 1012 of the electrical accessory 1000.

The junction box and/or electrical accessory 1000 shown in FIG. 28 is shown by way of example only, and other configurations, shapes, and designs can exist in accordance with other embodiments of the invention.

Figure 29A:
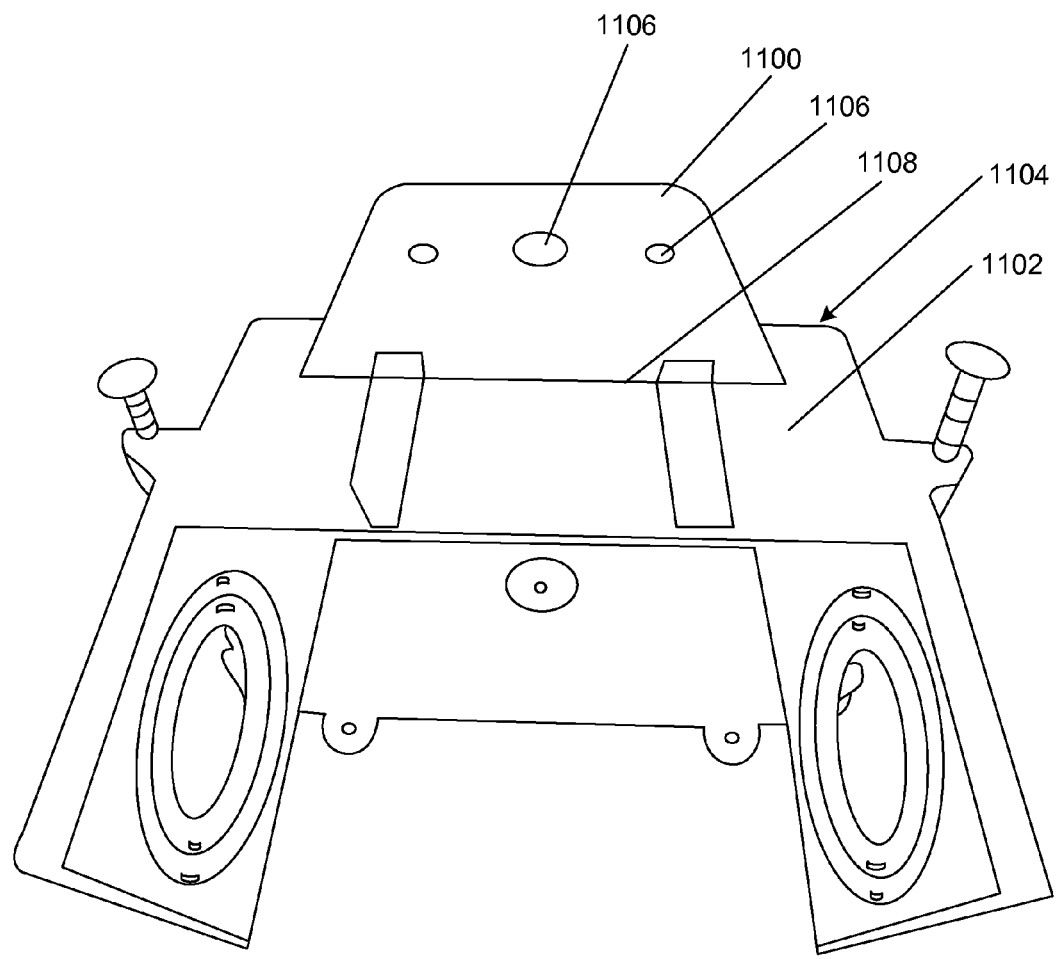
FIGS. 29A and 29B are side perspective views of an example hinge for a mountable junction box and/or electrical accessory in accordance with an embodiment of the invention.
Figure 29B:
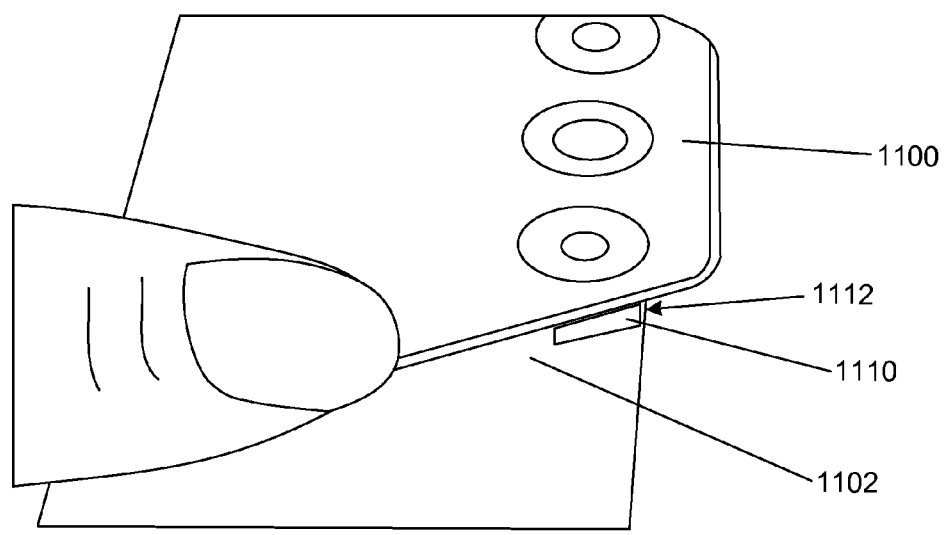

FIGS. 29A and 29B illustrate an example hinge for a mountable junction box and/or electrical accessory in accordance with an embodiment of the invention. In the embodiment shown in FIG. 29A, at least one side wall flap 1100 is operable to fold adjacent to at least one side wall 1102 of the junction box 1104 and/or electrical accessory. The side wall flap is further operable to mount the junction box 1104 and/or electrical accessory to an adjacent wall or wall stud. As shown in FIG. 29A, one or more mounting holes 1106 can be provided in the side wall flap 1100 to facilitate mounting the junction box 1104 and/or electrical accessory to an adjacent wall or wall stud. A living hinge 1108 positioned between the side wall flap 1100 and the side wall of the junction box 1104 permits the side wall flap 1100 to fold adjacent to and substantially against the side wall 1102. The living hinge permits the side wall flap 1100 to be maintained as an integral portion of the junction box 1104 and/or electrical accessory. In one example, the living hinge can be a relatively flexible portion of material disposed between the side wall flap 1100 and the side wall of the junction box 1104. In another example, a living hinge may be a mechanical type device disposed between the side wall flap 1100 and the side wall of the junction box 1104.

As shown in FIG. 29B, at least one latch 1110 is operable to maintain the side wall flap 1100 in a folded position adjacent to and substantially against the side wall 1102 of the junction box 1104 and/or electrical accessory. The latch 1110 shown in FIG. 29B can be a relatively small portion of material with a detent 1112 operable to permit a portion of the side wall flap 1100, such as an edge, to snap relatively snug against the latch 1110 and maintain the position of the side wall flap 1100 in a folded position adjacent to and substantially against the side wall 1102. In other embodiments, one or more latches can be spaced apart along the side wall 1102.

The living hinge shown in FIGS. 29A and 29B is shown by way of example only, and other configurations, shapes, and designs can exist in accordance with other embodiments of the invention.

Figure 30:
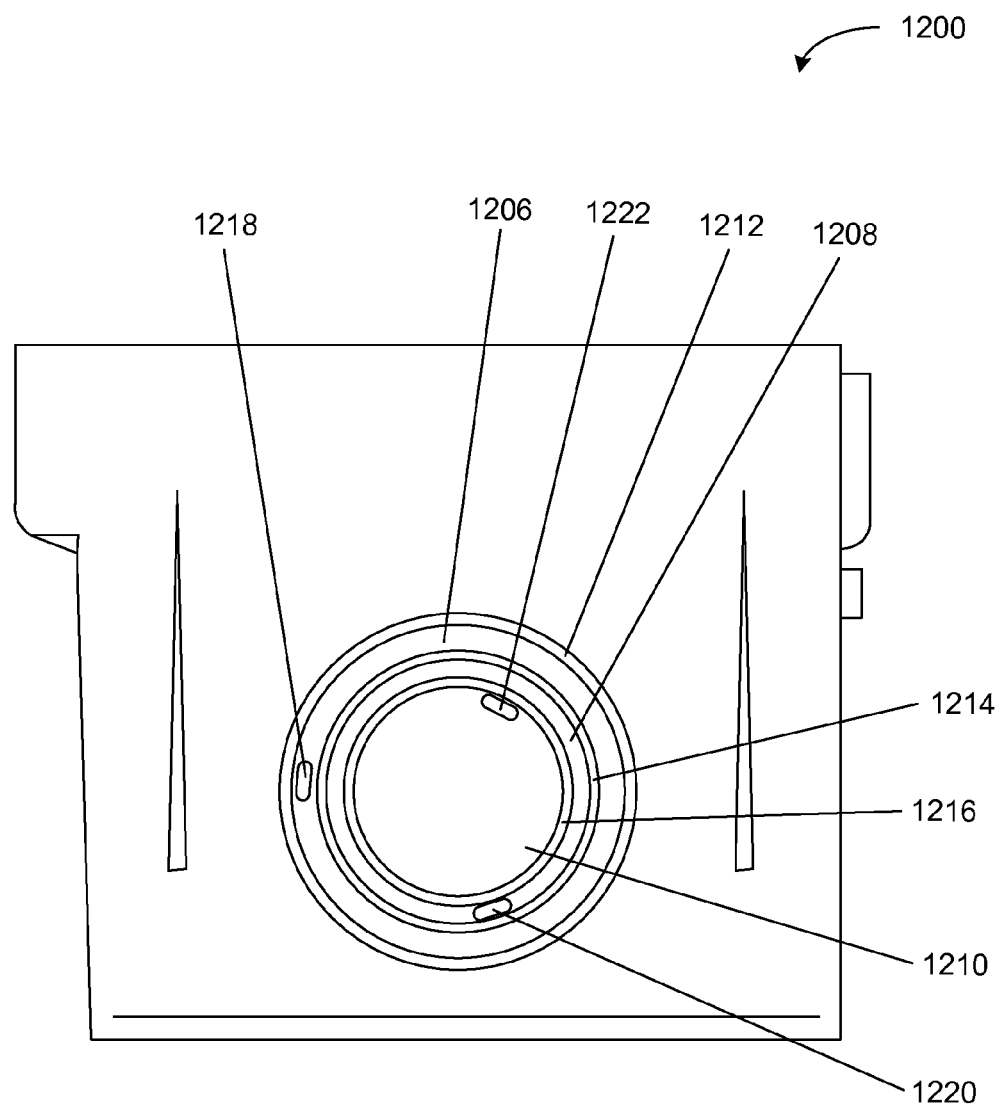
FIGS. 30-31 are overhead views of example concentric punchouts for a mountable junction box and/or electrical accessory in accordance with an embodiment of the invention.
Figure 31:
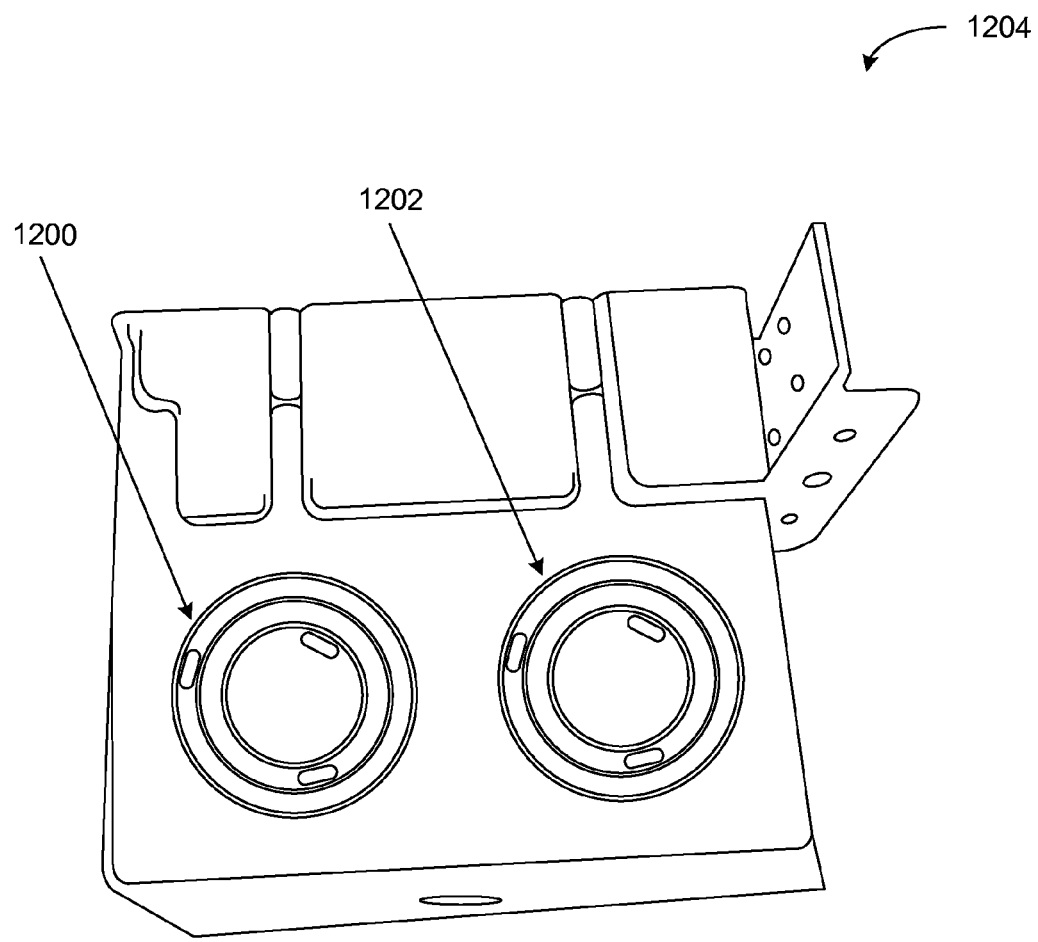
Figure 32:
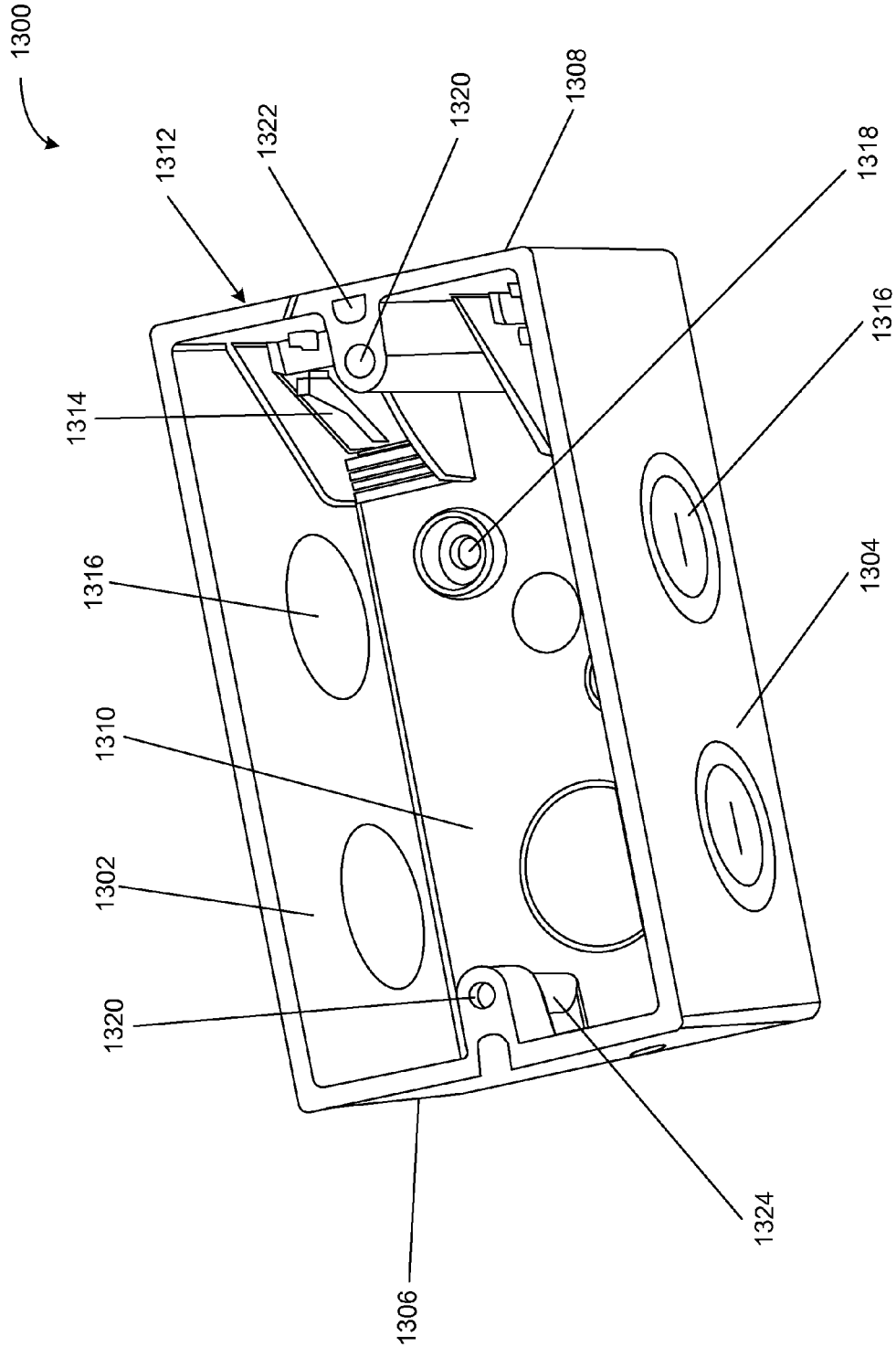
FIGS. 32-35 are views of another example mountable junction box and/or electrical accessory in accordance with an embodiment of the invention.
Figure 33:
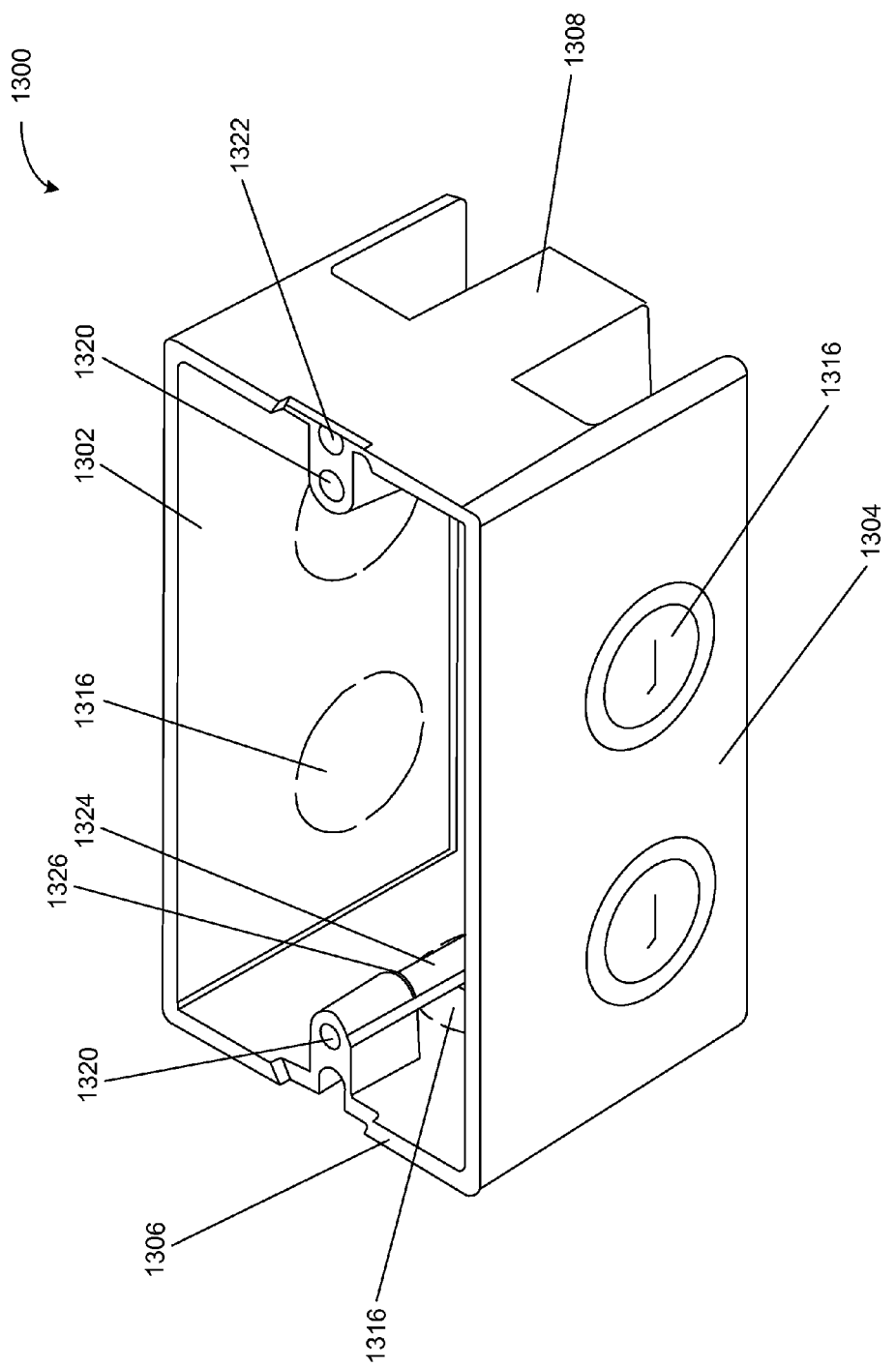
Figure 34:
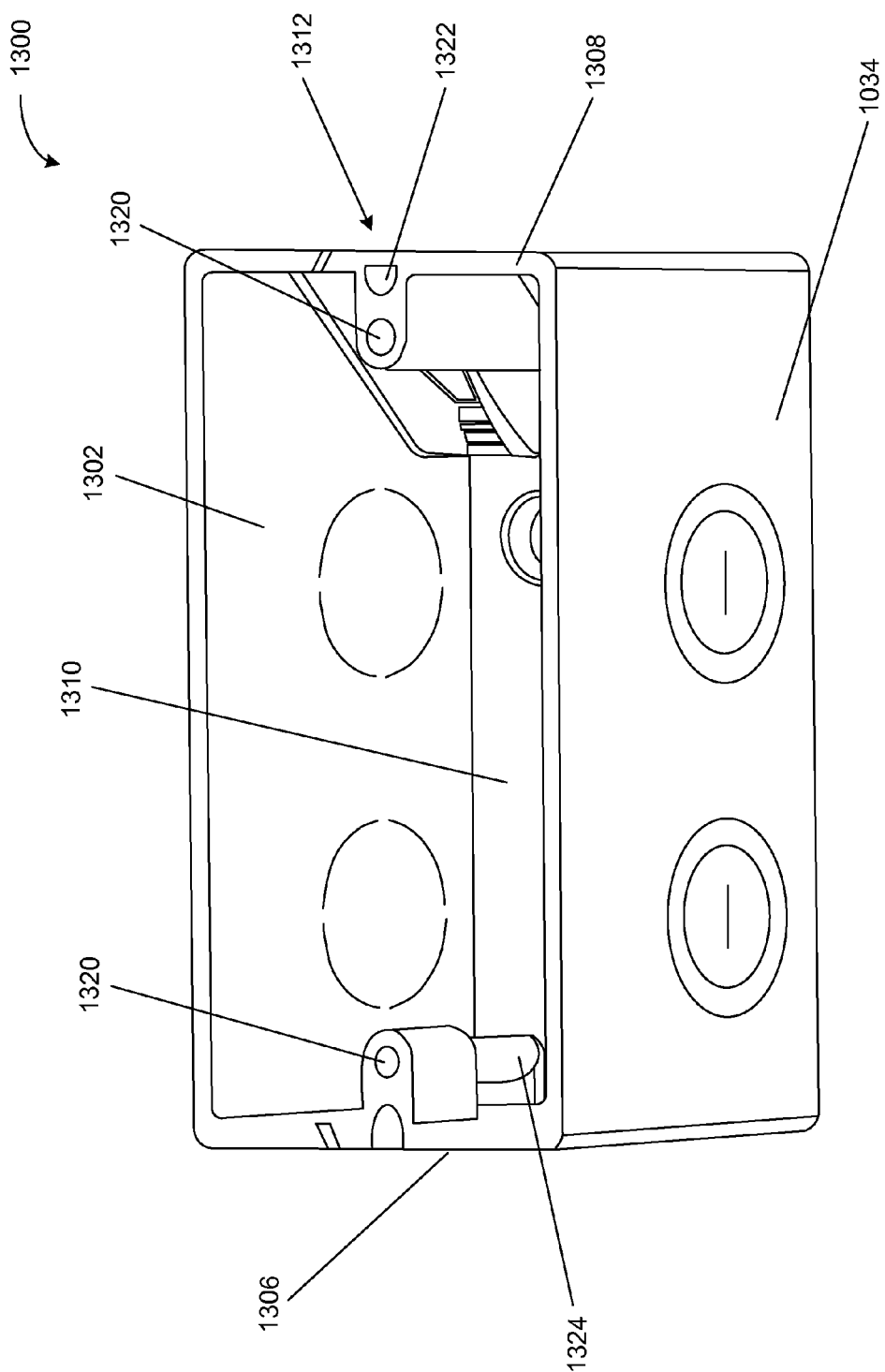

FIGS. 30-31 are overhead views of example concentric punch outs for a mountable junction box and/or electrical accessory in accordance with an embodiment of the invention. As shown in FIGS. 30-31, one or more series of concentrically aligned punch outs 1200, 1202 can be molded or otherwise machined into a side wall of a mountable junction box 1204 and/or electrical accessory. In this embodiment, each series of punch outs 1200, 1202 can include at least three punch outs 1206, 1208, 1210, which are evenly spaced or aligned from each other. Between each punch out 1206, 1208, 1210 or the wall of the junction box 1204, a respective circumferential groove 1212, 1214, 1216 can separate the punchouts 1206, 1208, 1210, and each circumferential groove 1212, 1214, 1216 outlines the respective punch out 1206, 1208, 1210. In the embodiments shown in FIGS. 30-31, each groove 1212, 1214, and 1216 is approximately the same depth.

A series of depressions 1218, 1220, 1222, evenly spaced apart from each other, can be molded or otherwise machined in each of the punch outs 1206, 1208, 1210. Each of the depressions 1218, 1220, 1222 can accommodate a tip of a screwdriver or other relatively sharp edged object to facilitate receiving a force to knock out or otherwise remove the corresponding punchout.

In this manner, a mountable junction box and/or electrical accessory can be modified as needed to accommodate different sized cable or electrical wire runs or other junction box and/or electrical accessory features. The alignment and depths of the grooves, punch outs, and depressions can be adjusted as needed from the relative dimensions and orientations shown in FIG. 30 to facilitate the removal of the punch outs.

The punch outs shown in FIGS. 30-31 are shown by way of example only, and other configurations, shapes, and designs can exist in accordance with other embodiments of the invention.

FIGS. 32-35 are views of another example mountable junction box and/or electrical accessory in accordance with an embodiment of the invention. In the embodiment shown in FIGS. 32-35, an electrical junction box 1300 can include a rectangular-shaped housing that includes a pair of side walls 1302, 1304, an upper wall 1306, a lower wall 1308, and a rear wall 1310. In the embodiment shown, such as 1300 in FIGS. 32-35, one or more cable openings 1312, clamps 1314, punch outs 1316, and mounting holes 1318 can be included. A pair of receptacle mount openings or holes 1320 in the front portion of the junction box 1300 and/or electrical accessory is sized to receive an electrical component, such as a switch or outlet, which can be mounted within the junction box 1300 and/or electrical accessory via one or more screws or fasteners secured within the receptacle mount openings or holes 1320.

Furthermore, the junction box 1300 and/or electrical accessory shown in FIGS. 32-35 can include a series of coverplate mounting holes 1322 positioned at the opposing end walls 1306, 1308, of the junction box 1300 and/or electrical accessory to receive corresponding coverplate mounting screws or fasteners. In the embodiment shown in FIGS. 32-35, the coverplate mounting holes 1322 are intended to be slotless or otherwise substantially covered to protect and shield the coverplate mounting screws or fasteners. In this manner, the coverplate mounting holes 1322 can protect the mounting screws or fasteners from contacting any exposed electrical wiring within or extending from, or adjacent to the junction box 1300 and/or electrical accessory.

In addition, as shown in FIGS. 32-35, a cylindrically-shaped shield 1324 can extend from the lower portion of each of the receptacle mount openings or holes 1320. Each of the cylindrically-shaped shields 1324 can substantially cover a corresponding mounting screw or fastener which is threaded into or otherwise inserted into the receptacle mount openings or holes 1320. In this manner, the cylindrically-shaped shields 1324 can protect the mounting screws or fasteners from contacting any exposed electrical wiring within the junction box 1300 and/or electrical accessory.

Figure 35:
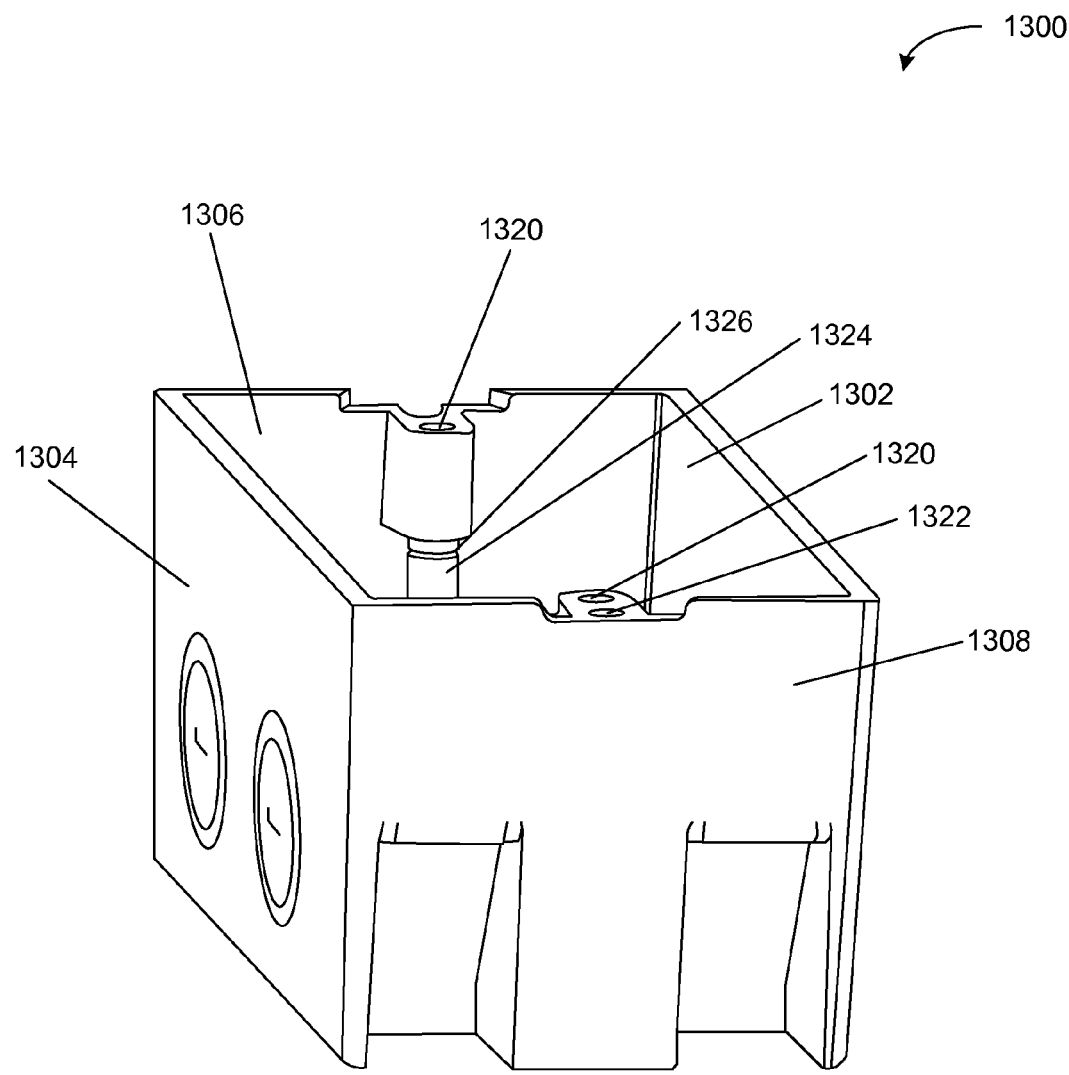

In one embodiment, and as shown in FIG. 35, a horizontally-oriented groove 1326 or depression can be molded or otherwise machined into a portion of each cylindrically-shaped shields 1324. The grooves 1326 can facilitate removal of the cylindrically-shaped shields 1324 should an adjacent punch out 1316 on the respective end walls 1306, 1308 be removed. Since the punch outs 1316 and cylindrically-shaped shields 1324 are not in direct or other substantial contact with each other, the removal of the adjacent punch out 1316 can facilitate removal of the cylindrically-shaped shields 1324 since the grooves 1326 provide a stress point or weakened material portion to remove the shields 1324 from the junction box 1300 and/or electrical accessory.

In one embodiment, the punch outs, such as 1316, can be a series of concentrically aligned punch outs similar to the configuration shown in FIG. 30 described above. In any instance, a junction box such as 1300 can be configured with either concentrically aligned punch outs and/or non-concentrically aligned punch outs, which are illustrated as 216 in FIGS. 6A and 6B.

The junction box 1300 and/or electrical accessory shown in FIGS. 32-35 is shown by way of example only, and other configurations, shapes, and designs can exist in accordance with other embodiments of the invention.

Figure 36:
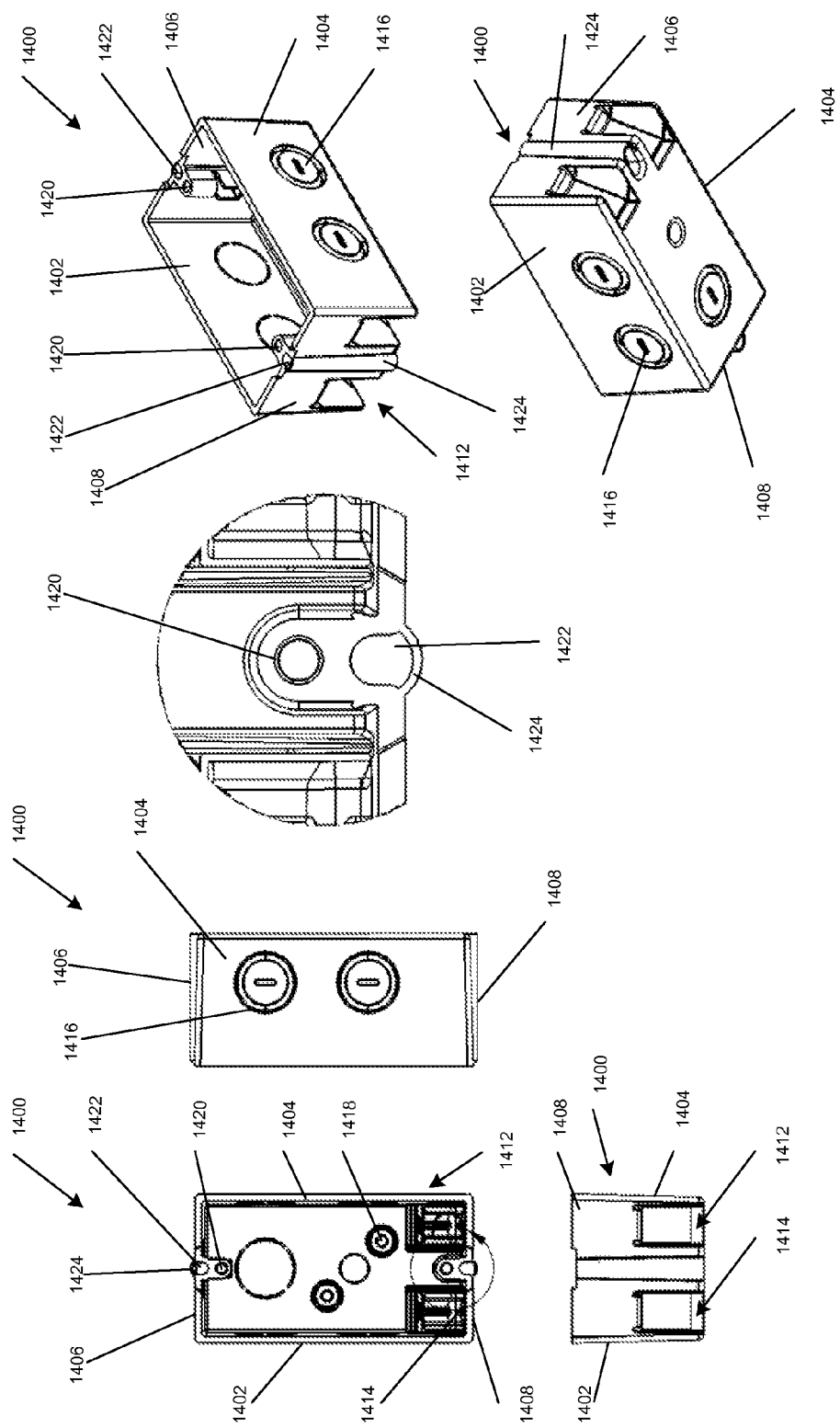
FIG. 36 is yet another example mountable junction box and/or electrical accessory in accordance with an embodiment of the invention.

FIG. 36 is yet another example mountable junction box and/or electrical accessory in accordance with an embodiment of the invention. Beginning at the top of the figure and moving left to right, the views include an upper view, a left side view, a detail upper view from the top view, a right, overhead perspective view, a lower end view, and a left, lower side perspective view. In the embodiment shown in FIG. 36, an electrical junction box 1400 can include a rectangular-shaped housing that includes a pair of side walls 1402, 1404, an upper wall 1406, a lower wall 1408, and a rear wall 1410. In the embodiment shown, such as 1400 in FIG. 36, one or more cable openings 1412, clamps 1414, punch outs 1416, and mounting holes 1418 can be included. A pair of receptacle mount openings or holes 1420 in the front portion of the junction box 1400 and/or electrical accessory is sized to receive an electrical component, such as a switch or outlet, which can be mounted within the junction box 1400 and/or electrical accessory via one or more screws or fasteners secured within the receptacle mount openings or holes 1420.

Furthermore, the junction box 1400 and/or electrical accessory shown in FIG. 36 can include a series of coverplate mounting holes 1422 positioned at the opposing end walls 1406, 1408, of the junction box 1400 and/or electrical accessory to receive corresponding coverplate mounting screws or fasteners. In the embodiment shown in FIG. 36, the coverplate mounting holes 1422 are intended to be slotless or otherwise substantially covered to protect and shield the coverplate mounting screws or fasteners. As shown in the embodiment, protrusions 1424 including the coverplate mounting holes 1422 can extend from the end walls 1406, 1408 as needed to accommodate the coverplate mounting screws or fasteners within the junction box 1400 and/or electrical accessory. In this manner, the coverplate mounting holes 1422 and protrusions 1424 can protect the mounting screws or fasteners from contacting any exposed electrical wiring within or extending from, or adjacent to the junction box 1400 and/or electrical accessory.

The junction box 1400 and/or electrical accessory shown in FIG. 36 is shown by way of example only, and other configurations, shapes, and designs can exist in accordance with other embodiments of the invention.

Figure 37:
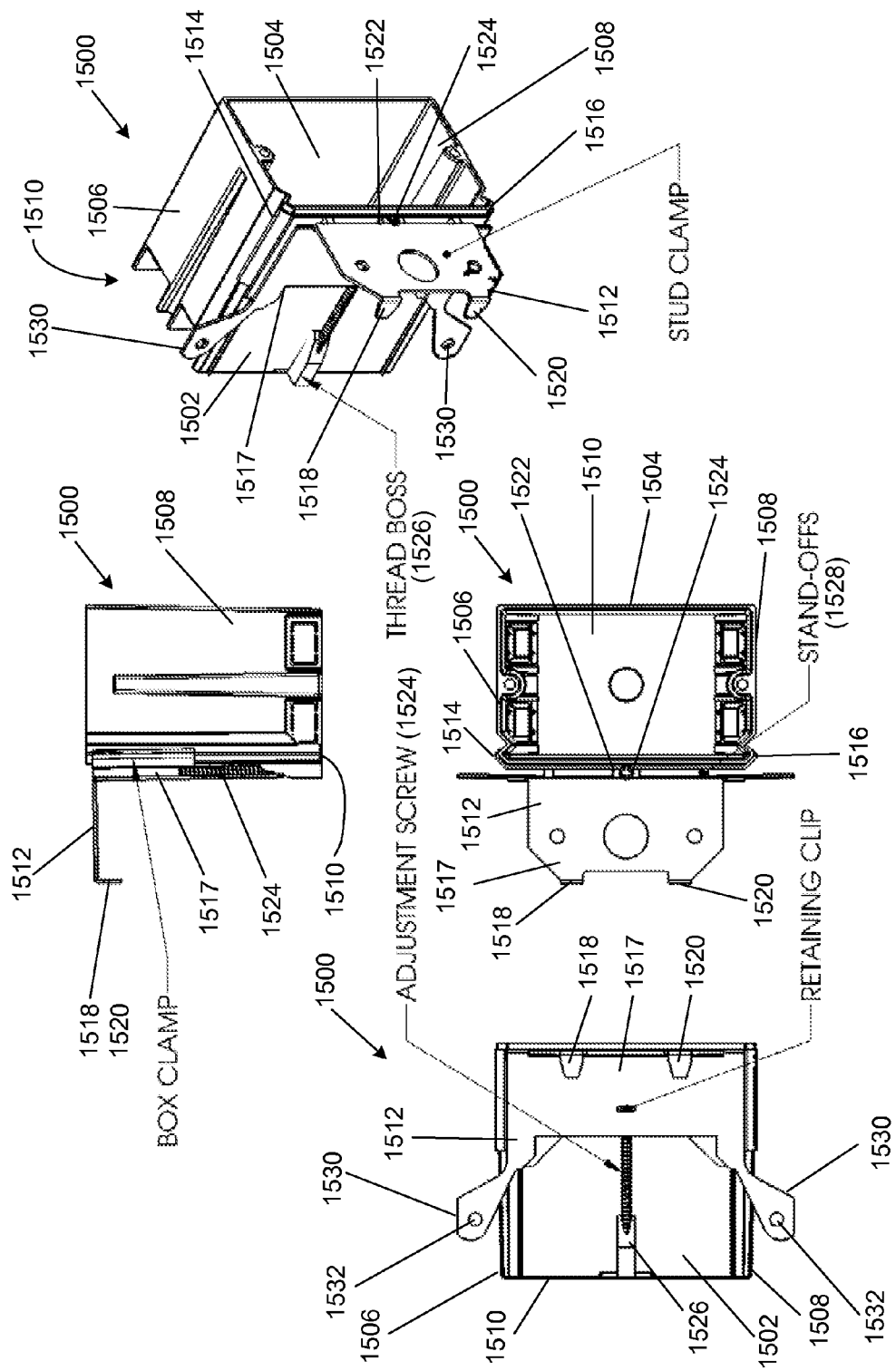
FIG. 37 is an arrangement of views of yet another example mountable junction box and/or electrical accessory in accordance with an embodiment of the invention.

FIG. 37 is an arrangement of views of yet another example mountable junction box and/or electrical accessory in accordance with an embodiment of the invention. Beginning at the top of the figure and in a clockwise direction, the views include a bottom view, a left upper perspective view, a front view, and a left side view. In the embodiment shown in FIG. 37, an electrical junction box 1500 can include a rectangular-shaped housing that includes a pair of side walls 1502, 1504, an upper wall 1506, a lower wall 1508, and a rear wall 1510. The junction box 1500 can also include an adjustable bracket 1512 operable for mounting the junction box 1500 to an adjacent wall or wall stud can be oriented substantially adjacent to at least one side wall, such as 1502. The bracket 1512 can include, for instance, a pair of protrusions 1514, 1516 or box clamp operable to engage a portion of correspondingly shaped grooves in the upper wall 1506 and lower wall 1508 of the junction box 1500, a mounting surface 1517, and, for instance, another pair of protrusions 1518, 1520 or stud clamp operable to engage a portion of a stud wall or stud. The pair of protrusions 1514, 1516 or box clamp can be part of a sliding plate portion of the adjustable bracket 1512 which can generally conform with the exterior shape of a portion of the rectangular-shaped housing, such as a portion of the side wall 1502 and a portion of the upper wall 1506. In this example, the pair of protrusions 1514, 1516 can be generally V-shaped. The mounting surface 1517 can generally be square L-shaped. The other pair of protrusions 1518, 1520 or stud clamp can be part of a mounting plate portion of the adjustable bracket 1512 which can generally conform with the exterior shape of a portion of a stud wall or stud. In this example, the other pair of protrusions 1518, 1520 can be generally square-U shaped. In addition, the bracket can include a mounting hole 1522 or retaining clip between the protrusions 1514, 1516 to receive a screw or fastener 1524 operable to adjust the forward or rearward position of the bracket 1512 with respect to the junction box 1500. When the screw or fastener 1524 is threaded or otherwise inserted through the mounting hole 1522 and into a junction box mounting hole 1526 or thread boss molded or otherwise connected to the side wall of the junction box 1500, the tightening or loosening of the screw or fastener 1524 can rotate the screw or fastener 1524, thus moving the bracket 1512 with the screw or fastener 1524 as it travels with respect to the junction box 1500.

In one embodiment, the electrical junction box 1500 can include one or more stand-offs 1528 or pieces of material either molded or integral to a side wall such as 1502 or integral or molded to the bracket 1512. In any instance, the stand-offs 1528 are operable to maintain a predefined distance between the side wall 1502 and the adjustable bracket 1512.

In one embodiment, the adjustable bracket 1512 can include one or more stud extensions 1530 and one or more stud extension mounting holes 1532 to facilitate mounting the bracket 1512 to a portion of a stud wall or stud.

In this manner, an embodiment of an adjustable bracket, such as 1512, can accommodate a rectangular-shaped junction box or electrical accessory with greater internal volume for electrical devices and/or terminations.

The adjustable bracket 1512 and junction box 1500 and/or electrical accessory shown in FIG. 37 is shown by way of example only, and other configurations, shapes, and designs can exist in accordance with other embodiments of the invention.

Figure 38:
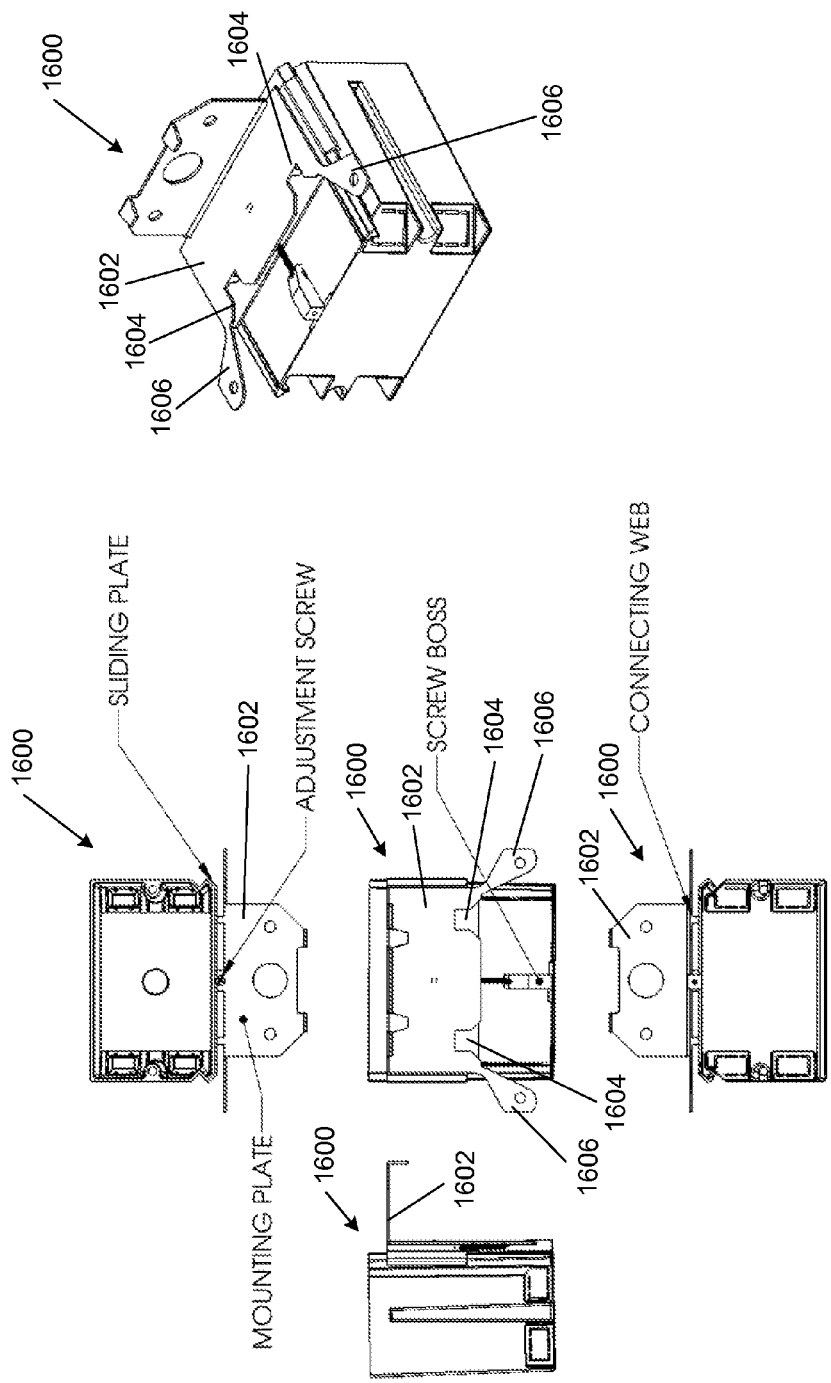
FIG. 38 is an arrangement of views of yet another example mountable junction box and/or electrical accessory in accordance with an embodiment of the invention.

FIG. 38 is an arrangement of views of yet another example mountable junction box and/or electrical accessory in accordance with an embodiment of the invention. Beginning at the top of the figure and in a clockwise direction, the views include a top view, a front left underside perspective view, a bottom view, and an upper side view. A left side view is oriented in the center of FIG. 38. In the embodiment shown in FIG. 38, the electrical junction box 1600 shown is similar to that shown in FIG. 37, but with a different shape adjustable bracket 1602. The adjustable bracket 1602 shown in FIG. 38 includes a pair of notches 1604 adjacent to a pair of stud extensions 1606 on the lower portion of the bracket 1602. The number, shape, and configuration of the notches 1604 can accommodate various corresponding shapes and configurations of a stud wall or stud. The adjustable bracket 1602 is shown in greater detail in FIG. 40.

The adjustable bracket 1602 and junction box 1600 and/or electrical accessory shown in FIG. 38 is shown by way of example only, and other configurations, shapes, and designs can exist in accordance with other embodiments of the invention.

Figure 39:
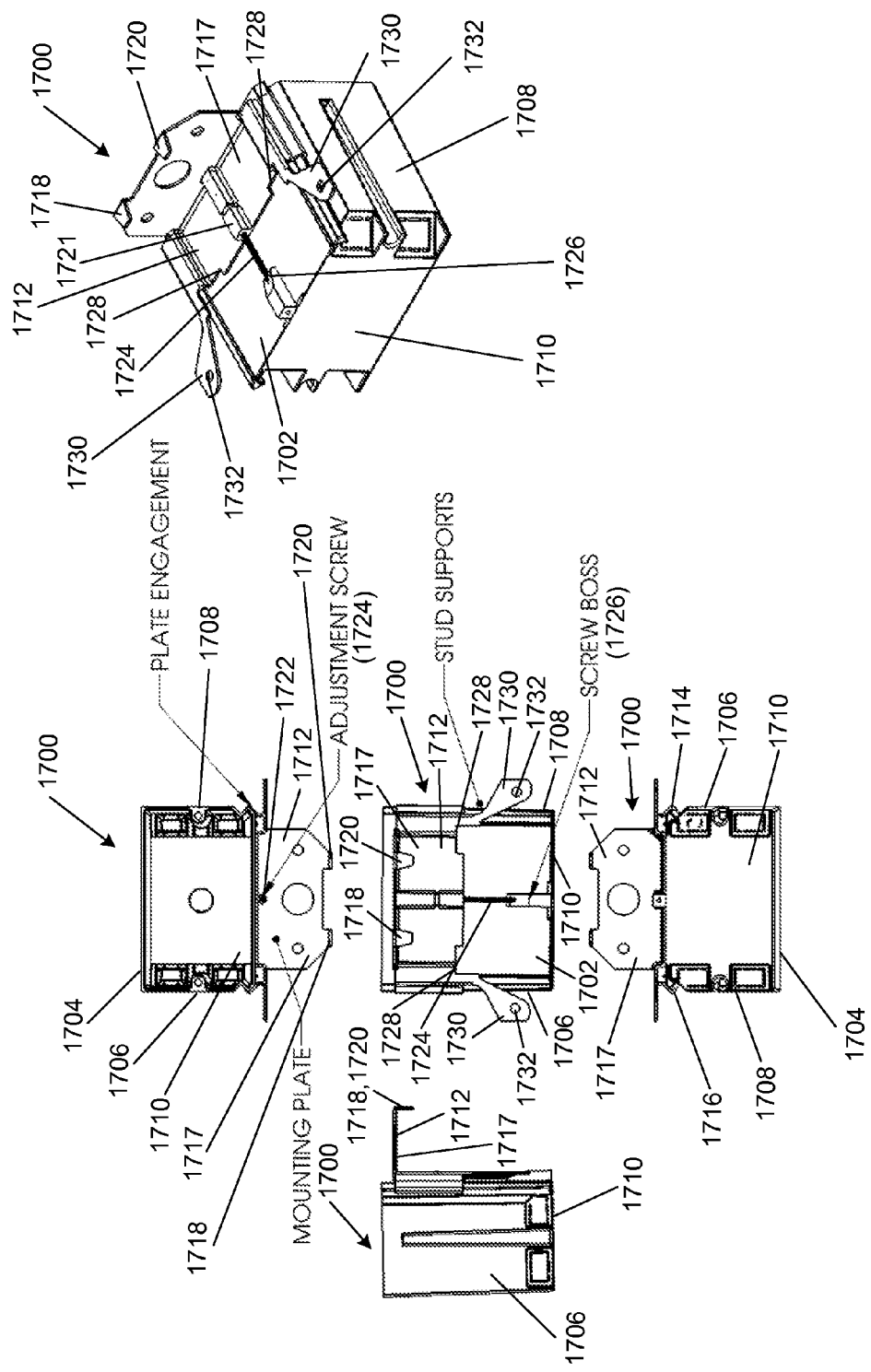
FIG. 39 is an arrangement of views of yet another example mountable junction box and/or electrical accessory in accordance with an embodiment of the invention.

FIG. 39 is an arrangement of views of yet another example mountable junction box and/or electrical accessory in accordance with an embodiment of the invention. Beginning at the top of the figure and in a clockwise direction, the views include a top view, a front left underside perspective view, a bottom view, and an upper side view. A left side view is oriented in the center of FIG. 39. In the embodiment shown in FIG. 39, an electrical junction box 1700 can include a rectangular-shaped housing that includes a pair of side walls 1702, 1704, an upper wall 1706, a lower wall 1708, and a rear wall 1710. The junction box 1700 can also include an adjustable bracket 1712 operable for mounting the junction box 1700 to an adjacent wall or wall stud can be oriented substantially adjacent to at least one side wall, such as 1702. The bracket 1712 can include a pair of protrusions 1714, 1716 or box clamp operable to engage a portion of correspondingly shaped grooves in the upper wall 1706 and lower wall 1708 of the junction box 1700, a mounting surface 1717, and another pair of protrusions 1718, 1720 or stud clamp operable to engage a portion of a stud wall or stud. The pair of protrusions 1714, 1716 or box clamp can be part of a sliding plate portion of the adjustable bracket 1712 which can generally conform with the exterior shape of a portion of the rectangular-shaped housing, such as a portion of the side wall 1702 and a portion of the upper wall 1706. The mounting surface 1717 can generally be square L-shaped. The other pair of protrusions 1718, 1720 or stud clamp can be part of a mounting plate portion of the adjustable bracket 1712 which can generally conform with the exterior shape of a portion of a stud wall or stud. In addition, the bracket can include a housing 1721 with a mounting hole 1722 or retaining clip between the protrusions 1714, 1716 to receive a screw or fastener 1724 operable to adjust the forward or rearward position of the bracket 1712 with respect to the junction box 1700. When the screw or fastener 1724 is threaded or otherwise inserted through the housing 1721 and mounting hole 1722 and into a junction box mounting hole 1726 or thread boss molded or otherwise connected to the side wall of the junction box 1700, the tightening or loosening of the screw or fastener 1724 can rotate the screw or fastener 1724, thus moving the bracket 1712 with the screw or fastener 1724 as it travels with respect to the junction box 1700.

In one embodiment, the electrical junction box 1700 can include one or more stand-offs or pieces of material either molded or integral to a side wall such as 1702 or integral or molded to the bracket 1712. In any instance, the stand-offs are operable to maintain a predefined distance between the side wall 1702 and the adjustable bracket 1712.

In one embodiment, the adjustable bracket 1702 shown in FIG. 39 includes one or more notches 1728 adjacent to a pair of stud extensions 1730 on the lower portion of the bracket 1712. The number, shape, and configuration of the notches 1728 can accommodate various corresponding shapes and configurations of a stud wall or stud.

In one embodiment, the adjustable bracket 1712 can include one or more stud extensions 1730 and one or more stud extension mounting holes 1732 to facilitate mounting the bracket 1712 to a portion of a stud wall or stud.

The adjustable bracket 1712 and junction box 1700 and/or electrical accessory shown in FIG. 39 is shown by way of example only, and other configurations, shapes, and designs can exist in accordance with other embodiments of the invention.

Figure 40:
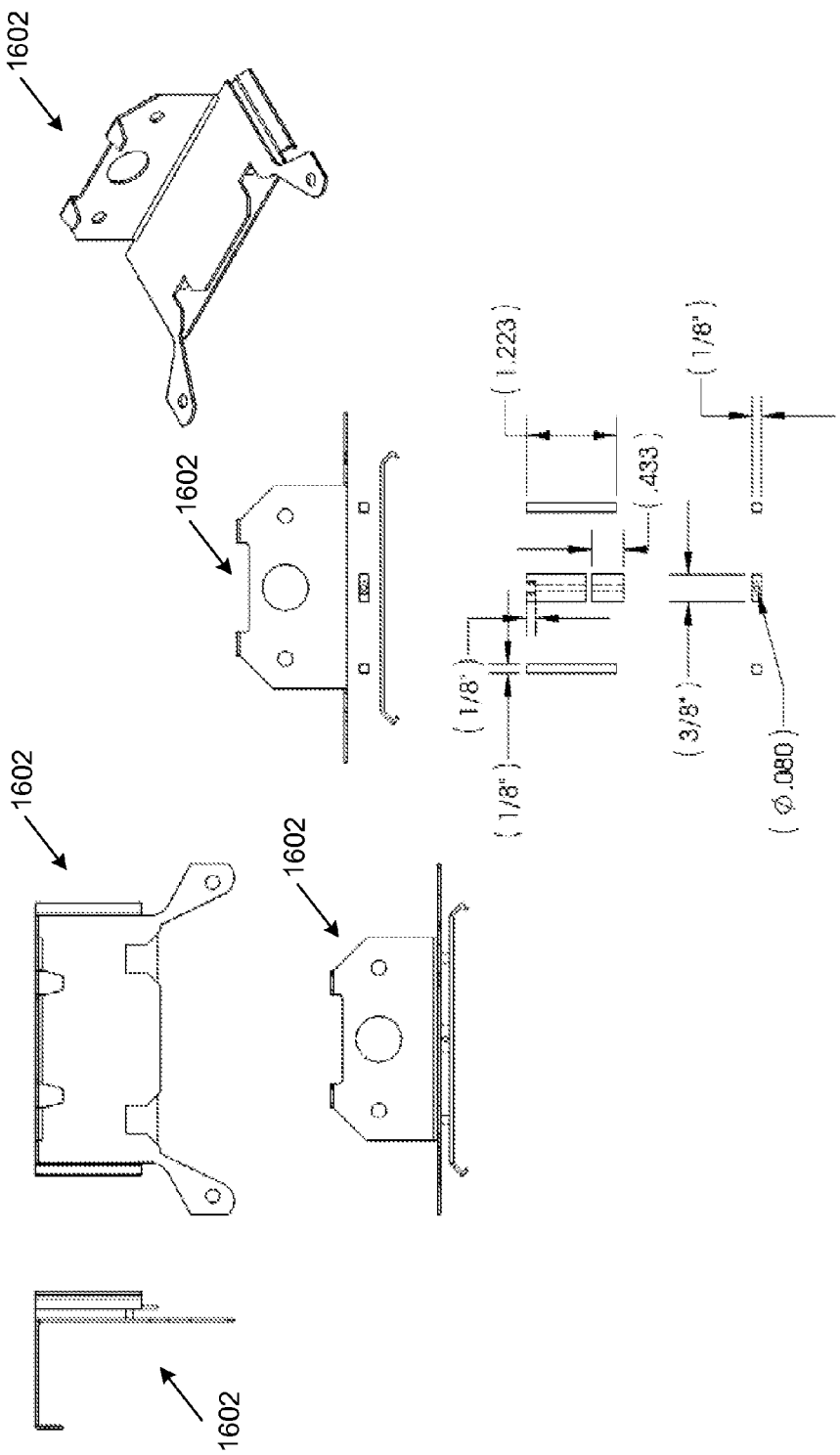
FIG. 40 is an arrangement of views of the example mounting bracket shown in FIG. 38.

FIG. 40 illustrates a series of views of the example adjustable bracket 1602 shown in FIG. 38. From left to right, and top to bottom, the views shown are a front edge view, a left side view, an upper view, an upper exploded view, and a front left lowerside perspective view. Example dimensions for various components of the adjustable bracket 1602 are shown in the lower portion of FIG. 40.

The adjustable bracket 1602 and dimensions shown in FIG. 40 is shown by way of example only, and other configurations, shapes, and designs can exist in accordance with other embodiments of the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. In an electrical accessory comprising:
    a frame comprising:
        a first side wall and a second side wall in parallel relation to each other; and
        a first end wall and a second end wall in parallel relation to each other and disposed between the first and second side walls; and
        a rear wall coupled to the first and second side walls and the first and second end walls;
        wherein the first and second side walls and the first and second end walls define an opening configured to receive an electrical device;
    a first receptacle mount opening disposed in the frame adjacent the opening, the first receptacle mount opening comprising a first cavity having a first longitudinal axis and extending from a first end adjacent the opening to a second end towards the rear wall, the first receptacle mount opening configured to receive a first fastener for the electrical device;
    the improvement comprising:
    a cylindrically-shaped shield comprising:
        a first shield end directly coupled to the first receptacle mount opening;
        a distal second shield end;
        an outer surface having a first diameter extending from the first shield end to the second shield end;
        a groove disposed along the outer surface of the shield, the groove reducing the first diameter of the outer surface along a portion of the shield between the first shield end and the second shield end;
        a second cavity having a longitudinal axis, wherein the first longitudinal axis of the first cavity and the longitudinal axis of the second cavity are axially aligned;
        wherein the shield extends from the second end of the first receptacle mount opening towards the rear wall,
        wherein the shield is removably coupled to the first receptacle mount opening and, wherein the groove is configured to facilitate decoupling of the shield from the second end of the first receptacle mount opening.

2. The electrical accessory of claim 1, further comprising a first coverplate mounting hole disposed in the frame adjacent the opening, the first coverplate mounting hole comprising a third cavity extending from the opening towards the rear wall, the first coverplate mounting hole configured to receive a first fastener for a coverplate, wherein the first coverplate mounting hole is disposed adjacent to the first receptacle mount opening.

3. The electrical accessory of claim 2, wherein the first coverplate mounting hole and the first receptacle mount opening are aligned along a vertical axis of the frame.

4. The electrical accessory of claim 2, wherein the first coverplate mounting hole and the first receptacle mount opening are disposed in the first end wall.

5. The electrical accessory of claim 4, further comprising a knockout disposed on the first end wall and positioned adjacent the shield.

6. The electrical accessory of claim 4, further comprising:
    a second receptacle mount opening disposed in the second end wall and adjacent the opening, the second receptacle mount opening comprising a fourth cavity having a second longitudinal axis and extending from a first end adjacent the opening to a second end towards the rear wall, the second receptacle mount opening configured to receive a second fastener for the electrical device;

a second coverplate mounting hole disposed in the second end wall adjacent the opening and the second receptacle mount opening, the second coverplate mounting hole comprising a fifth cavity extending from the opening towards the rear wall, the second coverplate mounting hole configured to receive a second fastener for the coverplate; and a second cylindrically-shaped shield extending from the second end of the second receptacle mount opening towards the rear wall, the second cylindrically-shaped shield comprising:
a third shield end directly coupled to the second receptacle mount opening;
a distal fourth shield end;
a second outer surface having a second diameter extending from the third shield end to the fourth shield end; and
a sixth cavity having a third longitudinal axis,
wherein the second longitudinal axis of the fourth cavity and the third longitudinal axis of the sixth cavity are axially aligned and wherein the second cylindrically-shaped shield is removably coupled to the second receptacle mount opening.

7. The electrical accessory of claim 6, wherein the third cavity of the first coverplate mounting hole and the fifth cavity of the second coverplate mounting hole are each substantially covered along respective longitudinal axes and configured to shield the respective first and second fasteners for the coverplate received therein.

8. The electrical accessory of claim 6, wherein the first end wall comprises a top surface and a bottom surface and wherein the second end wall comprises a top surface and a bottom surface;
wherein the first receptacle mount opening and the first cavity are disposed along the top surface of the first end wall;
wherein the first coverplate mounting hole is disposed adjacent the bottom surface of the first end wall;
wherein the second receptacle mount opening and the fourth cavity are disposed along the bottom surface of the second end wall; and
wherein the second coverplate mounting hole is disposed adjacent the top surface of the second end wall.

9. The electrical accessory of claim 8, wherein at least a portion of a first outer surface of the first coverplate mounting hole comprises a first protrusion that extends below the bottom surface of the first end wall and wherein at least a portion of a second outer surface of the second coverplate mounting hole comprises a second protrusion that extends above the top surface of the second end wall.

10. The electrical accessory of claim 6, wherein the second cylindrically-shaped shield further comprises:
a second groove disposed along the second outer surface, the second groove reducing the second diameter of the second outer surface along a first portion of the second cylindrically-shaped shield between the third shield end and the fourth shield end,
wherein the second groove is configured to facilitate decoupling of the second cylindrically-shaped shield from the second end of the second receptacle mount opening.

11. In an electrical junction box comprising:
a frame comprising:
at least one side wall; and
a rear wall coupled to the at least one first side wall;
wherein the at least one side wall defines an opening configured to receive an electrical device;
a first receptacle mount opening disposed in the frame adjacent the opening, the first receptacle mount opening comprising a first cavity having a first longitudinal axis and extending from a first end adjacent the opening to a second end towards the rear wall, the first receptacle mount opening configured to receive a first fastener for the electrical device;
the improvement comprising:
a cylindrically-shaped shield extending from the second end of the first receptacle mount opening towards the rear wall, the shield comprising:
a first shield end directly coupled to the first receptacle mount opening;
a distal second shield end;
a cylindrically-shaped outer surface having a first diameter extending from the first shield end to the second shield end;
a groove disposed along the outer surface of the shield, the groove reducing the first diameter of the outer surface along a portion of the shield between the first shield end and the second shield end; and
a second cavity having a longitudinal axis, wherein the first longitudinal axis of the first cavity and the longitudinal axis of the second cavity are axially aligned,
wherein the shield is removably coupled to the first receptacle mount opening, and
wherein the groove is configured to facilitate decoupling of the shield from the second end of the first receptacle mount opening.

12. The electrical junction box of claim 11, further comprising a first coverplate mounting hole disposed in the frame adjacent the opening, the first coverplate mounting hole comprising a third cavity extending from the opening towards the rear wall, the first coverplate mounting hole configured to receive a first fastener for a coverplate, wherein the longitudinal axis of the second cavity of the shield is not axially aligned with the third cavity of the first coverplate mounting hole.

13. The electrical junction box of claim 11, wherein the first coverplate mounting hole and the first receptacle mount opening are disposed in a first wall of the at least one side wall.

14. The electrical junction box of claim 13, wherein the first wall comprises an exterior surface and an interior surface;
wherein the first receptacle mount opening and the first cavity are disposed along the interior surface of the first wall; and
wherein the first coverplate mounting hole is disposed adjacent the exterior surface of the first wall.

15. The electrical junction box of claim 13, wherein at least a portion of an outer surface of the first coverplate mounting hole comprises a first protrusion that extends outward from the exterior surface of the first wall.

16. The electrical junction box of claim 11, further comprising:
a second receptacle mount opening disposed in the second end wall and adjacent the opening, the second receptacle mount opening comprising a third cavity having a second longitudinal axis and extending from a first end adjacent the opening to a second end towards the rear wall, the second receptacle mount opening configured to receive a second fastener for the electrical device;

a second coverplate mounting hole disposed in the second end wall adjacent the opening and the second receptacle mount opening, the second coverplate mounting hole comprising a fourth cavity extending from the opening towards the rear wall, the second coverplate mounting hole configured to receive a second fastener for the coverplate; and a second cylindrically-shaped shield extending from the second end of the second receptacle mount opening towards the rear wall, the second cylindrically-shaped shield comprising:
- a third shield end directly coupled to the receptacle mount opening;
- a distal fourth shield end;
- a second outer surface having a second diameter extending from the third shield end to the fourth shield end;
- a second groove disposed along the second outer surface, the second groove reducing the second diameter of the second outer surface along a first portion of the second cylindrically-shaped shield between the third shield end and the fourth shield end;
- a fifth cavity having a third longitudinal axis,
- wherein the second longitudinal axis of the third cavity and the third longitudinal axis of the fifth cavity are axially aligned and wherein the second cylindrically-shaped shield is removably coupled to the second receptacle mount opening, and
- wherein the second groove is configured to facilitate decoupling of the second cylindrically-shaped shield from the second end of the second receptacle mount opening.

17. The electrical accessory of claim 11, further comprising at least one punch out disposed on the at least one side wall and positioned adjacent the shield.

18. In an electrical junction box comprising:
at least one side wall; and
a rear wall coupled to the at least one first side wall;
wherein the at least one side wall defines an opening configured to receive an electrical device;
a first receptacle mount opening disposed in the frame adjacent the opening, the first receptacle mount opening comprising a first cavity having a first longitudinal axis and extending from a first end adjacent the opening to a second end towards the rear wall, the first receptacle mount opening configured to receive a first fastener for the electrical device;
the improvement comprising:
a cylindrically-shaped shield directly coupled to and extending from the second end of the first receptacle mount opening towards the rear wall, the shield comprising:
- a first shield end directly coupled to the second end of the first receptacle mount opening;
- a distal second shield end;
- a cylindrically-shaped outer surface having a first diameter extending from the first shield end to the second shield end;
- a groove disposed along the outer surface of the shield, the groove reducing the first diameter of the outer surface along a portion of the shield between the first shield end and the second shield end; and
- a second cavity having a longitudinal axis,
- wherein the first longitudinal axis of the first cavity and the longitudinal axis of the second cavity are axially aligned and wherein the groove facilitates decoupling of the shield from the first receptacle mount opening.

* * * * *